United States Patent
Curtis et al.

(10) Patent No.: US 12,158,880 B1
(45) Date of Patent: Dec. 3, 2024

(54) HYPERPARAMETER TUNING FOR ANOMALY DETECTION SERVICE IMPLEMENTING MACHINE LEARNING FORECASTING

(71) Applicant: SPLUNK, INC., San Francisco, CA (US)

(72) Inventors: Kristal Curtis, San Francisco, CA (US); William Deaderick, Austin, TX (US); Tanner Gilligan, San Bruno, CA (US); Joseph Ross, Redwood City, CA (US); Abraham Starosta, Boston, MA (US); Sichen Zhong, Santa Clara, CA (US)

(73) Assignee: Splunk Inc., San Jose, CA (US)

( * ) Notice: Subject to any disclaimer, the term of this patent is extended or adjusted under 35 U.S.C. 154(b) by 15 days.

(21) Appl. No.: 17/978,153

(22) Filed: Oct. 31, 2022

(51) Int. Cl.
G06F 16/22 (2019.01)
G06F 16/242 (2019.01)
G06F 16/2458 (2019.01)
G06F 16/28 (2019.01)

(52) U.S. Cl.
CPC ............ *G06F 16/242* (2019.01); *G06F 16/22* (2019.01); *G06F 16/2474* (2019.01); *G06F 16/287* (2019.01)

(58) Field of Classification Search
CPC .... G06F 16/242; G06F 16/22; G06F 16/2474; G06F 16/287
See application file for complete search history.

(56) References Cited

U.S. PATENT DOCUMENTS

| | | | |
|---|---|---|---|
| 7,739,143 B1 * | 6/2010 | Dwarakanath ..... | G06Q 30/0202 705/7.31 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |

(Continued)

OTHER PUBLICATIONS

Bretz, P. et al., "Notes on Bayesian Changepoint Detection" pp. 1-12, Nov. 19, 2020.

(Continued)

*Primary Examiner* — Jorge A Casanova
(74) *Attorney, Agent, or Firm* — Rutan & Tucker LLP

(57) ABSTRACT

Implementations of this disclosure provide an anomaly detection system and methods of performing anomaly detection on a time-series dataset. The anomaly detection may include utilization of a forecasting machine learning algorithm to obtain a prediction of points of the dataset and comparing the predicted value of a point in the dataset with the actual value to determine an error value associated with that point. Additionally, the anomaly detection may include determination of a sensitivity threshold that impacts whether points within the dataset associated with certain error values are flagged as anomalies. The forecasting machine learning algorithm may implement a seasonality component determination process that accounts for seasonality or patterns in the dataset. A search query statement may be automatically generated through importing the sensitivity threshold into a predetermined search query statement that implements that forecasting machine learning algorithm.

20 Claims, 15 Drawing Sheets

(56) References Cited

U.S. PATENT DOCUMENTS

| | | | |
|---|---|---|---|
| 9,215,240 | B2 | 12/2015 | Merza et al. |
| 9,286,413 | B1 | 3/2016 | Coates et al. |
| 10,127,258 | B2 | 11/2018 | Lamas et al. |
| 10,305,758 | B1* | 5/2019 | Bhide ................. G06F 11/3409 |
| 10,628,435 | B2* | 4/2020 | Saini ..................... G06F 16/248 |
| 10,872,031 | B2 | 12/2020 | Ross |
| 11,023,577 | B2* | 6/2021 | Saini ..................... G06N 20/00 |
| 11,392,845 | B2* | 7/2022 | Singh .................. G06F 16/2433 |
| 11,663,109 | B1* | 5/2023 | Deaderick ........... G06F 11/3006 702/179 |
| 11,921,609 | B2* | 3/2024 | Batoukov ........... G06F 11/0793 |
| 2016/0103838 | A1* | 4/2016 | Sainani ................... G06F 16/24 707/725 |
| 2017/0154275 | A1* | 6/2017 | Maheshwari .......... G06N 5/045 |
| 2018/0300737 | A1* | 10/2018 | Bledsoe .......... G06Q 10/06395 |
| 2019/0098106 | A1 | 3/2019 | Mungel et al. |
| 2019/0138643 | A1* | 5/2019 | Saini ................... G06F 16/2474 |
| 2019/0391901 | A1* | 12/2019 | Gupta ...................... G06N 3/08 |
| 2020/0125471 | A1* | 4/2020 | Garvey ................ G06F 18/217 |
| 2021/0168019 | A1* | 6/2021 | Qingsong ............. H04L 41/064 |
| 2022/0180179 | A1* | 6/2022 | Gusat ...................... G06F 16/22 |
| 2022/0342860 | A1* | 10/2022 | Gonzalez Macias ........................ G06F 21/552 |
| 2022/0345473 | A1* | 10/2022 | Kare ................... H04L 63/1425 |
| 2023/0105970 | A1* | 4/2023 | Woo ....................... G06Q 10/04 705/7.11 |

OTHER PUBLICATIONS

K. Curtis, et. al. "Automated Determination of Tuned Parameters for Analyzing Observable Metrics," filed Jan. 31, 2023, U.S. Appl. No. 18/103,966 including its prosecution history.

K. Curtis, et. al. "System and Method for Automated Determination of Search Query Parameters for Anomaly Detection," filed Jun. 10, 2022, U.S. Appl. No. 17/837,931 including its prosecution history.

Ruggieri, E. et al., "Short Communication—A Bayesian approach to detecting change points in climatic records" DOI: 10.1002/joc.3447. Int. J. Climatol. (2012).

Splunk, Inc., "Setup Detectors and Alerts for Actionable Insights." https://www.youtube.com/watch?v=2Gvw_DACcWc, dated Sep. 16, 2021.

Z. Wang et. al. "System and Method for Categorical Drift Detection," filed Feb. 2, 2022, U.S. Appl. No. 17/591,528 including its prosecution history.

Z. Wang et. al. "System and Method for Changepoint Detection in Streaming Data," filed Feb. 2, 2022, U.S. Appl. No. 17/591,511 including its prosecution history.

Z. Wang et. al. "System and Method for Format Drift and Format Anomaly Detection," filed Feb. 2, 2022, U.S. Appl. No. 17/591,535 including its prosecution history.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

HYPERPARAMETER TUNING FOR ANOMALY DETECTION SERVICE IMPLEMENTING MACHINE LEARNING FORECASTING

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Computer system management and data analysis have many challenges. All the computers on a network generate massive amounts of data in log files, telemetry files, reports, etc. The sheer quantity of data can easily overwhelm a human operator, and automation is needed to make the load more manageable. The same is true of searchable data stores that may contain massive quantities of data that need to be searched and evaluated. One area in need of automated assistance is in anomaly detection. An anomaly is an event that falls outside the norm for a particular activity or data set. For example, a data center operator needs to know when something "unusual" happens in one of their systems or networks. It could be that some parameters need to be modified to improve the efficiency of a server or the overall network traffic flow. It could also be the first inkling that a cyber-attack or exploit is underway.

In another exemplary case, a stockbroker or analyst using the computer system and network wants to know when one of the stocks they are following does something "unusual." They could write a script or create a machine learning model or use a variety of indicators, but that requires knowledge that they may not possess, have sufficient expertise to do, or simply not have the time to do so.

In yet another exemplary case, an agricultural scientist analyzing various factors related to crop yields wants to explain an unexpected decline in production of certain crops. An analysis of historical data in various related factors like temperature, precipitation, ground water, pesticide use, etc., could pinpoint a likely area for further investigation.

BRIEF DESCRIPTION OF THE DRAWINGS

Illustrative examples are described in detail below with reference to the following figures.

DETAILED DESCRIPTION

Figure 1A:
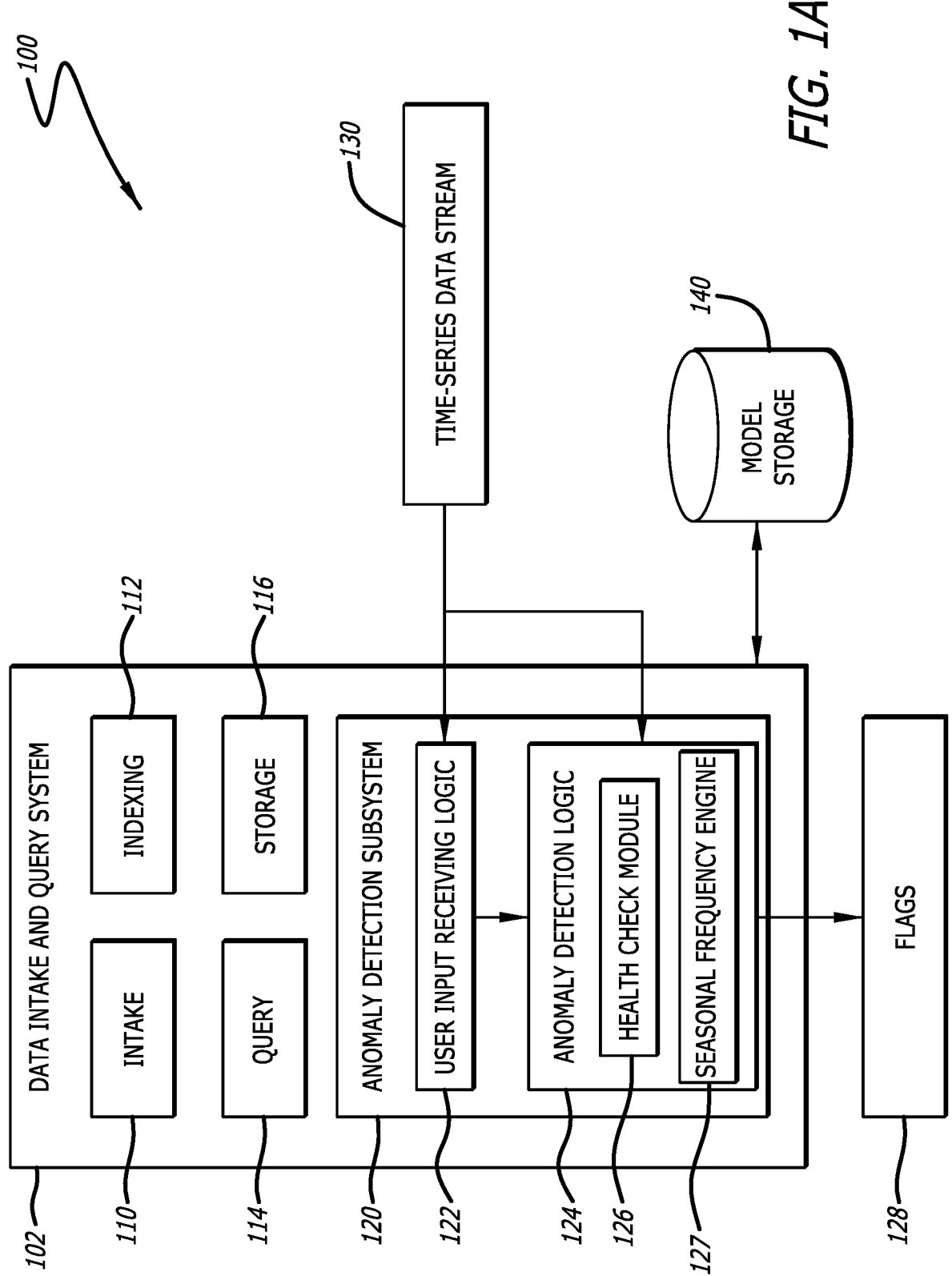
FIG. 1A is a block diagram illustrating a data query system including an anomaly detection logic according to an implementation of the disclosure.

Computer system management and data analysis have many challenges. Many computers on a network generate massive amounts of data in log files, telemetry files, reports, etc. The sheer quantity of data can easily overwhelm a human operator, and automation is needed to make the load more manageable. The same is true of searchable data stores that may contain massive quantities of data that need to be searched and evaluated.

One area in need of automated assistance is in anomaly detection. An anomaly is an event that falls outside the norm for a particular activity or data set. For example, a data center operator needs to know when something "unusual" happens in one of their systems or networks. It could be that some parameters need to be modified to improve the efficiency of a server or the overall network traffic flow. It could also be the first inkling that a cyber-attack or exploit is underway.

In another exemplary case, a stockbroker or analyst using the computer system and network wants to know when one of the stocks they are following does something "unusual." They could write a script or create a machine learning model or use a variety of indicators, but that requires knowledge that they may not possess, have sufficient expertise to do, or simply not have the time to do so.

In yet another exemplary case, an agricultural scientist analyzing various factors related to crop yields wants to explain an unexpected decline in production of certain crops. An analysis of historical data in various related factors like temperature, precipitation, ground water, pesticide use, etc., could pinpoint a likely area for further investigation. An automated method for determining what is or is not normal in time-series data (like a daily listing of stock prices or computer logs or agricultural factors) would prove beneficial in many fields.

As discussed above, anomaly detection is a challenging aspect of computer system management and data analysis due to the large quantity of data that may need to be searched and then analyzed. Typically, this data may be indexed in a searchable data store. An anomaly may be an event that falls outside the norm for a particular activity, represented by time-series data or log data. In the context of time-series data, examples of anomalies may include but are not limited or restricted to, an acute drop or rise in the value of received data, an uncharacteristic "flatline" of the value of received data over time, or a recurring timeframe variation (e.g., minute, hour, day, week, etc.) which fails to appear for a particular timeframe.

Time-series data is a list of values of some parameter or variable that are ordered by a timestamp associated with the parameter or variable. Examples might be a computer log of login events, historical data for an industrial process, daily stock prices, sales data for a retail store, central processing unit (CPU) usage, CPU temperature, and the like. These activities and many others may have normal patterns. When these patterns are broken in some way, this may be of interest to an analyst (e.g., a network administrator, security specialist, etc.). The challenge is finding the anomalies in a large data store using a data intake and query system, such as the data intake and query system 102 of FIG. 1A.

Additionally, analysts vary in their desires for the types of alerts each would like to be provided. For instance, analysts may differ in the sensitivity of anomalies they wish to be alerted about due to factors that are specific to an individual or enterprise (e.g., staffing, experience, funding, policies). Thus, current anomaly detection systems typically involve some degree of manual configuration or tuning through specification of parameter values by the user, where the specified parameter values materially affect the behavior of the anomaly detection system. However, some users may not be experienced with the intricacies of anomaly detection systems and provide parameters values that lead to undesirable anomaly detections. Additionally, users often engage in a trial-and-error approach to finding appropriate parameter values, which is a costly and time-consuming endeavor that the systems and methods of this disclosure seek to avoid.

The systems and methods of this disclosure provide an anomaly detection system and methods of implementing the same for identifying parameters that are to be imported into a search query statement that, when executed against stored or streaming data, causes anomaly detection within the stored or streaming data. For example, as discussed above, the data intake and query system 102 may be configured to execute pipelined search queries that are built using a conventional pipelined command language (e.g., SPLUNK® SPL) where the search queries implement anomaly detection analyses and include the identified parameters.

In some implementations, the search query statements may implement or deploy machine learning techniques such as forecasting algorithms to build a predictive model of the next data point in a time-series based on preceding data points and flag the next data point as anomalous when the true value of the next data point differs significantly (e.g., outside of a threshold distance) from the predicted value, referred to as an "error value."

A sensitivity threshold allows for the anomaly detection process to account for user preferences as to how "surprising" or unpredictable a data point should be in order to be considered anomalous. The larger the value of the sensitivity threshold, the greater an error value the forecaster must produce on a point in order for it to be flagged as an anomaly.

As a result, the sensitivity threshold may significantly influence the behavior of the anomaly detection results. Importantly, the systems and methods of the disclosure provide novel operations for performing an anomaly detection process through execution of a search query statement that implements a forecasting machine learning algorithm and automatically determines a sensitivity threshold based on mathematical optimization techniques.

Further, the systems and methods disclosed herein automatically incorporate the sensitivity parameter into a pipelined search query statement (e.g., a SPLUNK® SPL query) that, when executed on stored or streaming data, performs an anomaly detection process on the data according to the determined sensitivity threshold. Results of the execution of the pipelined search query include data points flagged as anomalies.

Referring now to FIG. 1A, a block diagram illustrating a data query system including an anomaly detection logic is shown according to an embodiment of the disclosure. A data intake and query system 102 is shown to comprise an intake system 110, an indexing system 112, a query system 114, and a storage system 116. Also present in the data intake and query system 102 may be an anomaly detection subsystem 120, which may include a health check module 126 and a seasonal frequency engine 127. In some embodiments, anomaly detection subsystem 120 may be present elsewhere in the data intake and query system 102 like, for example, internal to the query system 114.

In further detail, the anomaly detection subsystem 120 may further comprise user input receiving logic 122 that, when executed by one or more processors, causes the anomaly detection subsystem 120 or more broadly the data intake and query system 102 to receive user input that indicates a data source to which an anomaly detection is to be performed. For example, the user input may be received via a graphical user interface rendered on a display screen of a network device. The user input may be in the form of a location of a data source, a path to a particular data source (e.g., a comma-separated values (CSV) document), or a location at which streaming data is received by the data intake and query system 102. In some embodiments, the data source may correspond to time-series data such as the time-series data stream 130 (e.g., an example of a time-series dataset). In one embodiment, the data source may be stored or streaming time-series data representing a Key Performance Indicator (KPI) variable (e.g., values of the KPI variable over time). As is known, a KPI variable can be any parameter of importance to a particular individual or enterprise. The time-series dataset may be provided to or otherwise obtained by the anomaly detection logic 124, which, upon execution by one or more processors, may be configured to begin an analysis thereof including determining a prediction of points (i.e., other than the first point) in the time-series dataset and determining one or more parameters to be used in an anomaly detection search query as discussed above.

In some implementations, the user input receiving logic 122 may also be configured, upon execution, to receive input corresponding to a number of anomalies to be detected in historical data, which is an indication as to the number of alerts the user prefers to receive. The number of alerts may be a particular real number or plus/minus a threshold number, e.g., within a range centered on the indicated number of anomalies. The indicated number of anomalies to be detected may be utilized as part of a heuristic in determining the parameters, where the heuristics are discussed below. In other implementations, the user input receiving logic 122 may be configured to generate and provide a graphical user interface (GUI) that receives, following provision of a set of anomaly detection results, user input indicating a user's desire to increase or decrease the sensitivity of the anomaly detection algorithm.

Operations performed by the anomaly detection logic 124 may include determining a prediction of points of the time-series data stream 130, determining an error value between each predicted value and the actual value of the corresponding point, determining an initial sensitivity threshold such that points within the time-series data stream satisfying a comparison with the initial sensitivity threshold are flagged as anomalous (e.g., flags 128). The prediction of points of the time-series data stream 130 may be performed through machine learning techniques including, in one example, a machine learning forecasting algorithm. In such examples, the machine learning forecasting algorithm may be executed to receive the time-series data stream 130 as input data and train a model on the time-series data stream 130 while also determining a prediction of the points within the time-series data stream 130. The prediction of a particular point may be performed based on the previous points within the time-series data stream 130. In one implementation, the prediction of a particular point is based on the entire set of previous points, which does not require use of a sliding window that would only account for a predetermined number of previous points. In some examples, execution of the machine learning forecasting algorithm using the time-series data stream 130 generates a trained forecasting machine learning model, which may be stored in the model storage 140.

Some implementations include sorting a list of the points within the time-series data stream by the error value associated with each point (e.g., greatest to lowest) and determining the initial sensitivity threshold. In some examples, the determination of the initial sensitivity threshold is performed through assessment using a set of heuristics (see FIG. 4A), as discussed below. Additionally, user input may be received to alter the sensitivity of the anomaly detection requiring adjustment of the sensitivity threshold. Adjustment of the sensitivity threshold may be performed using a clustering heuristic analysis that assesses the gaps in the error values between consecutive points in the sorted list. In some examples, the clustering heuristic analysis may be a method for selecting the parameters for k-means, i.e., k, referred to as the "elbow" method, which, in this disclosure, is specifically configured to assess a plot of the points of the time-series data stream (x-axis) and the corresponding error values (y-axis) and determine a curve of the plot ("the elbow") as seen in FIG. 4B. For instance, the elbow method may determine the elbow and then determine the next gap between consecutive points (per their error values) where a threshold is to be located (e.g., either to include detection of additional or fewer anomalies). By increasing the sensitivity, additional points will be flagged as anomalous and by decreasing the sensitivity, fewer points will be flagged as anomalous. As an alternative implementation, an "inverted" elbow method may be utilized to determine the revised sensitivity threshold to increase/decrease the sensitivity of the anomaly detection, where the inverted elbow method is discussed below. In particular, FIG. 6 details of one implementation of increasing/decreasing the sensitivity of the anomaly detection.

However, other examples of determining a sensitivity threshold may include setting the sensitivity threshold at a location in the sorted list following a predetermined number of points (e.g., below the top X points having the greatest error values such that the top X points are flagged as anomalous) or setting the sensitivity threshold at a location in the sorted list based on a predetermined error value (e.g., all points having at least a predetermined error value are flagged as anomalous).

The health status check module 126 of the anomaly detection logic 124 may perform an analysis on the time-series data stream 130 prior to the performance of the anomaly detection procedure. For example, the health status check module 126 may perform one or more of health check rules on the time-series data stream 130 to determine whether the time-series data stream 130 is in condition for the anomaly detection procedure. Results of the health status check module 126 indicate whether the time-series data stream 130 is formatted in such a way (e.g., evenly spaced points) and includes sufficient data (e.g., a low number of points having no value). Some implementations may include ending the health check analysis after a first health check rule fails and returning a flag indicating details of the failure to the user. Other implementations include performing all health check rules and providing details as to any flags indicating failure of a health check to the user. Further implementations include utilizing a trained classification machine learning model to obtain a predicted health score and reporting the health score. In some examples, the health status check module 126 may provide the user suggested fixes based on the flags and/or automatically perform certain fixes as will be discussed in further detail below.

When performing anomaly detection on a time-series dataset, one consideration that may improve the detection process is the determination of a seasonality component. The seasonal component (at time t) generally refers to a recurring variation in a time series data set, which can be representative of the influence of seasonal factors. Seasonality occurs over a particular period or unit of time (e.g., quarter of year, month, day of the week, etc.), which can be referred to as a seasonal frequency. In this regard, seasonal frequency generally refers to a period of a cyclic or seasonal component. Embodiments described herein are directed to the automated identification of seasonal frequency. As described herein, seasonal frequency, including multiple seasonal frequencies, can be identified in an automated manner. Utilizing implementations described herein, a seasonal frequency(s) can be efficiently and accurately determined. In particular, errors resulting from manual identification of seasonal frequency are avoided. Further, multiple seasonal frequencies can be efficiently and effectively identified in the data set. Such multiple seasonal frequencies can be identified in an iterative manner to accurately identify seasonal frequencies in the data set. Upon identifying seasonal frequency(s) associated with a data set, such seasonal frequency(s) may be provided to a user, for example, as a suggested seasonality parameter to use in performing online data decomposition and/or anomaly detection. In other cases, the identified seasonal frequency may be automatically used or incorporated into data analysis, such as online data decomposition and/or anomaly detection.

In operation, to perform automated seasonal frequency identification, embodiments described herein utilize both the auto-correlation function and spectral density function to identify seasonal frequency(s) associated with a time-series data set. In particular, both the auto-correlation function and spectral density function can be used to identify seasonal frequencies. Initially, the auto-correlation function can be used to identify candidate seasonal frequencies. A set of various filters, some of which leverage the spectral density function, can be applied to data to determine which, if any, of the candidate seasonal frequencies should be identified as a seasonal frequency for the data set.

As described, in some implementations, multiple seasonal frequencies may be identified in association with a data set. In such a case, and as described herein, an iterative process can be performed to identify each of the multiple seasonal frequencies associated with the data. In particular, in accordance with identifying one seasonal frequency, data decomposition can be performed to remove seasonality associated with that seasonal frequency and, thereafter, another seasonal frequency identification iteration (e.g., determining auto-correlation and spectral density functions to identify and/or filter candidate seasonal frequencies) can be applied with the updated data to identify an additional seasonal frequency associated with the data. Further, a data set may be downsampled and the downsampled dataset may be used in another iteration to identify an additional seasonal frequency.

Figure 1B:
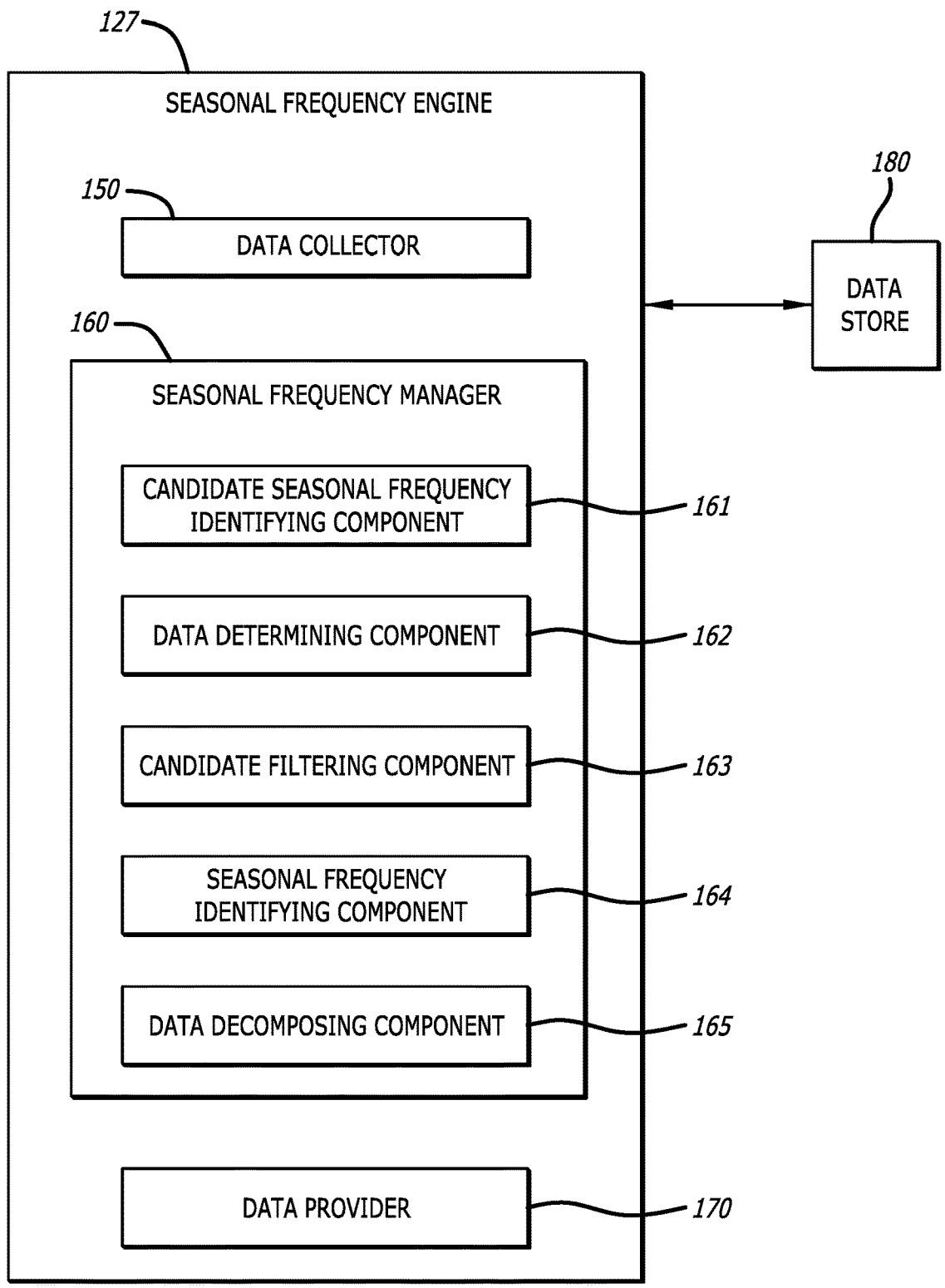
FIG. 1B is a block diagram illustrating the seasonal frequency engine of FIG. 1A is illustrated in accordance with implementations described.

Referring to now FIG. 1B, the seasonal frequency engine 127 is illustrated in accordance with implementations described herein. The seasonal frequency engine 127 is generally configured to facilitate seasonal frequency identification. In this regard, the seasonal frequency engine 127 generally identifies one or more seasonal frequencies for a data set. Seasonal frequency generally refers to a period or duration of a seasonality of a time series data set. Advantageously, in accordance with implementations described herein, the seasonal frequency engine 127 can identify multiple seasonal frequencies associated with a data set. As such, as a data set is obtained by the seasonal frequency engine 127, the data set can be analyzed to identify a set of seasonal frequencies associated therewith. Importantly, the seasonal frequency engine 127 can identify multiple seasonal frequencies that reflect various periods of a cyclic or seasonal component associated with the data set. Such an automated seasonal frequency identification, as described herein, can be performed efficiently with regard to both time and resources.

The seasonal frequency engine 127 can be implemented as server systems, program modules, virtual machines, components of a server or servers, networks, and the like. The seasonal frequency engine 127 may be in communication with the data store 180 to store and access data. In embodiments, the seasonal frequency engine 127 can provide data to the data store 180 for storage, which may be retrieved or referenced by any component of the seasonal frequency engine 127.

The data store 180 may be any data store configured to store data, such as data points, data components, seasonal frequency data (e.g., candidate seasonal frequencies, prominence data, auto-correlation function data, spectral density function data, etc.

As illustrated in FIG. 1B, the seasonal frequency engine 127 includes a data collector 150, a seasonal frequency manager 160, and a data provider 170.

In embodiments, the seasonal frequency engine 127, and/or operations associated therewith, may be initiated in response to detecting a triggering event. A triggering event may be any event that initiates identification of seasonal frequency(s). In some cases, a triggering event may be the reception of a command, or portion thereof, that provides an indication to initiate identification of a seasonal frequency, or set of seasonal frequencies. For example, in some cases, a user (e.g., an analyst) may input a command or selection (e.g., selection of an icon) via a graphical user interface to initiate an anomaly detection process.

The data collector 150 is configured to obtain data, such as a time-series dataset as discussed herein that may be associated with a particular metric (or a plurality thereof). A metric generally refers to any type or category of measurement, such as, for example, a performance metric or a security metric. For example, a time series data set may relate to a particular performance or usage of containers, hosts, CPU, memory, or the like.

As described, in accordance with initiating seasonal frequency identification, the data collector 150 may obtain a data set for use in identifying seasonal frequency. In some cases, the particular data set (e.g., associated with a particular source) may be specified in association with the command used to trigger the seasonal frequency identification. For example, a command initiating an anomaly detection process may reference a particular data set for use in performing seasonal frequency identification.

As described herein, some implementations may perform an iterative process to identify seasonal frequencies. Such an iterative process may include downsampling the data set to identify seasonal frequencies. In such cases, the number of data points (e.g., most recent data points) to use in performing seasonal frequency identification with the downsized data set may be determined.

The seasonal frequency manager 160 is generally configured to manage seasonal frequency identification. As illustrated in FIG. 1B, the seasonal frequency manager 160 includes a candidate seasonal frequency identifying component 161, a data determining component 162, a candidate filtering component 162, a seasonal frequency identifying component 164, and a data decomposing component 165.

The candidate seasonal frequency identifying component 161 is generally configured to identify a set of candidate seasonal frequencies. The candidate seasonal frequencies are determined from the data set being analyzed and can be of any number. In embodiments, candidate seasonal frequencies can be generally determined by identifying peaks in the ACF associated with the data set. In this regard, upon identifying peaks in the ACF associated with the data set, such peaks may be identified as candidate seasonal frequencies.

In one implementation, an auto-correlation function (ACF) may be used to identify peaks associated with the data set. An ACF generally measures the linear correlation between pairs of observations, or data points, as a function of the time lag between them. Stated differently, the auto-correlation function provides an indication of similarity of points in a data series that are x lag units apart from each other (i.e. is there a predictable pattern occurring at a particular time-lag/frequency). For instance, an ACF can indicate, with regard to all pairs of points that are separated by ten time units, a similarity of the values (e.g., on average). In some cases, the auto-correlation function may be provided or represented in the form of a graph (i.e., an ACF graph).

In some cases, a differenced data set (as opposed to a raw time series data set) can be used to identify peaks in the ACF. A differenced data set generally refers to a data set that reflects differences in consecutive data points. In this regard, the raw data points can be analyzed to determine a difference or change in value between each point (for each data point, subtract the previous data point). The auto-correlation function can then be calculated with respect to the set of differences, also referred to as the differenced data set. Utilizing differenced data can be advantageous, and more accurate, as such differenced data may account for some variants that may occur when analyzing raw values due to the raw data corresponding with different scales or being of different positive or negative values.

Using the ACF (e.g., ACF graph) associated with a data set (e.g., a differenced data set), the peaks can be identified as candidate seasonal frequencies.

The data determining component 162 is generally configured to determine data (e.g., seasonal frequency data) for use in identifying a seasonal frequency(s) associated with the data set. In some embodiments, the data determining component 162 determines data associated with the candidate seasonal frequencies. In some cases, such data may be determined prior to filter analysis applied via the candidate filtering component 163. In other cases, such data may be determined in connection with applying the filters.

Various types of data may be determined, such as, for example, spectral density function data, prominence data, peak distance data, and the like. As described, a spectral density function (SDF) generally measures the magnitude of a time series as a function of frequency. Stated differently, a spectral density function breaks a time series into a sum of multiple sine-waves and measures the magnitude of each of those waves. If a data set has a seasonal frequency, it will match up with one of the sine-waves and, thus, has a high magnitude. In some cases, the auto-correlation function may be provided or represented in the form of a graph (i.e., an SDF graph).

Although the SDF is generally described herein, as can be appreciated, implementations may alternatively or additionally use a periodogram function. A periodogram function generally estimates the spectral density of a signal. As such, references to spectral density function used herein can be understood to be or include a periodogram function.

Prominence data generally refers to data indicating how large a given peak is relative to values around the peak. Peak distance data generally refers to a distance between peaks (e.g., an ACF peak or an SDF peak). Additional or alternative types of data can be determined via the data determining component 162 to facilitate application of the filter, and the examples provided herein are not intended to be limiting.

The candidate filtering component 163 is generally configured to analyze the various candidate seasonal frequencies to filter out any candidate seasonal frequencies unlikely to be a seasonal frequency for the data. As described, multiple iterations of data analysis may be performed to identify multiple seasonality frequencies. As such, as can be appreciated, this presence filter should not filter out any candidate seasonal frequencies during execution of the first iteration of the process. To this end, in some cases, this presence filter may not be performed or operated in the first iteration of the process. A multiple peak filter is generally configured to analyze candidate seasonal frequencies to ensure that multiple peaks exist. In particular, for a particular candidate seasonal frequency, the multiple peak filter ensures that multiple peaks exist for that particular candidate seasonal frequency. By way of example, in analyzing a peak associated with a seasonal frequency n (e.g., 24), the multiple peak filter determines whether there is also a peak at 2n. In determining a peak exists at 2n (or other analyzed multiple of n), the candidate seasonal frequency passes the multiple peak filter. On the other hand, if it is determined that a peak does not exist at 2n, or other multiple of n analyzed, the corresponding seasonal frequency is filtered out as a candidate.

As can be appreciated, any multiplicity of peaks may be desired. For example, in some implementations, the multiple peak filter may verify that a peak exists at 2n for a particular seasonal frequency to remain as a candidate. In other implementations, the multiple peak filter may verify that a peak exists at 2n, 3n, and 4n in order for the seasonal frequency to remain as a candidate. Because of diminishing correlations, increasing the desired or required number of multiple corresponding peaks to a large number may result in an overly restrictive filter and thereby unnecessarily eliminate feasible candidate seasonal frequencies.

In embodiments, identifying that a multiple (e.g., 2n) of a peak exists may be based on an approximate determination. In this regard, the multiple peak filter can determine that another peak substantially exists at 2n, for example. Utilizing an approximation allows for analysis of non-perfect data. For example, a data set may not reflect a perfectly aligned sequence of two peaks at 24 and 48. As such, the multiple peak filter may identify whether approximate peak sequences exist for a given candidate seasonal frequency.

To identify whether a multiple of approximate peak sequences exist for a given candidate seasonal frequency, in one implementation, a minimal error sequence may be generated. In this way, a peak sequence having a minimal error sequence can be determined. By way of example only, assume a 24 hour seasonal frequency is being evaluated as a candidate. In such a case, the peaks can be analyzed to identify a sequence resulting in a minimal error to the 24-hour seasonal frequency. For instance, assume peaks at 47 and 50 exist subsequent to the peak at 24. In such a case, the peak at 47 would be selected for the peak sequence as the peak at 47 is closer to 48 than the peak at 50. The peak sequence can be of any size or number of peaks. For instance, a peak sequence of four peaks may be determined using a minimal error approach. Upon identifying a peak sequence, a peak sequence error can be determined. A peak sequence error indicates how far the peak sequence is off from being perfect. If the peak sequence error is within (e.g., below) a peak sequence error threshold value, then the multiple approximate peaks are deemed to exist and the candidate seasonal frequency is maintained. On the other hand, if the peak sequence error is not within (e.g., above) a peak sequence error threshold value, then the multiple approximate peaks are not deemed to exist and the candidate seasonal frequency is removed from the set of candidates.

Various parameters may be used to determine whether multiple peaks (e.g., approximately) exist for a given candidate seasonal frequency. For example, an ACF peak sequence error threshold parameter may indicate how far from perfect is allowable for the detected peak sequence. Such a distance may be indicated as a percentage of the base-multiple. For example, assume an ACF peak-sequence [12, 23, 37] is identified. In such a case, a true or perfect sequence of [12, 24, 36] would be expected, with a base-multiple of 12. This would yield an average error of two-thirds, which as a percentage of the base multiple 12, is ~5.6%. By increasing the peak sequence error threshold noisier peak-sequences can be detected, but may also increase false positives.

A peak location matching filter is generally configured to analyze candidate seasonal frequencies to ensure that an ACF associated with a candidate seasonal frequency corresponds with or matches a SDF peak. In particular, when an ACF peak occurs at x, a SDF peak is expected at 1/x. As such, this peak location matching filter ensures that the expected location of 1/x is sufficiently close to a SDF peak. To determine if the expected location is sufficiently close to a SDF peak (or vice versa), in some implementations, a bandwidth distance (e.g., one bandwidth) may be used. In this way, for example, an expected location can be determined as sufficiently close to a SDF peak if the SDF peak is within one bandwidth of the expected peak. A bandwidth distance generally refers to a resolution of the computed SDF, or a space or distance between points.

A multiple matching peak filter is generally configured to analyze candidate seasonal frequencies to select candidate seasonal frequencies associated with peaks that most closely match corresponding SDF peaks. As can be appreciated, in some cases, multiple ACF peaks may match or correspond with the same SDF peak.

A determination of an ACF peak that best matches a SDF peak may be determined in any of a number of ways. As one example, an ACF peak most close in distance, or nearest, to the SDF peak may be identified. As another example, an ACF peak having a greatest magnitude, or a highest absolute value, may be identified.

An auto-correlation function (ACF) prominence filter is generally configured to analyze candidate seasonal frequencies to ensure that an ACF peak associated with a candidate seasonal frequency is of, or has, sufficient prominence. Prominence of a peak generally refers to how large a given peak is relative to values around the peak. Peak prominence can be determined in any number of ways (e.g., via a SciPy library). Upon determining a prominence of a peak, the prominence can be compared to a prominence threshold. In cases that a threshold is met (e.g., the prominence is larger than the threshold), the corresponding candidate seasonal frequency can be maintained as a candidate. On the other hand, in cases that the threshold is not met (e.g., the prominence is smaller than the threshold), the corresponding candidate seasonal frequency can be removed as a candidate. The prominence threshold may be selected to result in a best precision/recall.

A spectral density function (SDF) prominence filter is generally configured to analyze candidate seasonal frequencies to ensure that a SDF peak associated with a candidate seasonal frequency is of, or has, sufficient prominence. As described, prominence of a peak generally refers to how large a given peak is relative to values around the peak. In some cases, the raw SDF values may be analyzed. In other cases, the raw SDF values may be used to generate a new set of values (e.g., log-10 of raw values) for use in analyzing prominence. Upon determining a prominence of a peak, the prominence can be compared to a prominence threshold. In cases that a threshold is met (e.g., the prominence is larger than the threshold), the corresponding candidate seasonal frequency can be maintained as a candidate. On other hand, in cases that the threshold is not met (e.g., the prominence is smaller than the threshold), the corresponding candidate seasonal frequency can be removed as a candidate. The prominence threshold may be selected to result in a best precision/recall. The prominence threshold may be a same or a different threshold value.

The seasonal frequency identifying component 164 is generally configured to manage identification of a seasonal frequency(s) for the data set. As described, various filters are applied to the candidate seasonal frequencies. The candidate seasonal frequencies maintained after application of each filter can result in a final set of candidate seasonal frequencies. Upon applying the various filters to the candidate seasonal frequencies, any number of candidate seasonal frequencies may exist in the final set. As such, the seasonal frequency identifying component 164 can manage identification seasonal frequencies.

In some embodiments, identification of seasonal frequency may depend on the number of candidate seasonal frequencies that exist after application of the various filters. Generally, and at a high level, when a seasonal frequency is identified in a particular analysis iteration, the seasonal frequency identifying component can initiate another iteration of the analysis process in an effort to identify another seasonal frequency associated with the data set. When no seasonal frequency is identified in a particular analysis iteration, the data set can be downsampled and another iteration of the analysis process is applied in an effort to identify another seasonal frequency.

In this regard, upon applying the various filters, the seasonal frequency identifying component 164 can determine whether any candidate seasonal frequencies remain in the set of candidates. In some cases, only a single candidate seasonal frequency may remain upon applying the filters. In such a case, that remaining candidate seasonal frequency can be designated as a seasonal frequency for the data set. In other cases, multiple candidate seasonal frequencies May remain upon applying the filters. In some embodiments, one of the multiple candidate seasonal frequencies may be identified or designated as a seasonal frequency. For instance, a smallest or minimum seasonal frequency is identified or designated as a seasonal frequency associated with the data set. By way of example only, assume a daily seasonal frequency and a weekly seasonal frequency have survived application of the filters and remain as candidate seasonal frequencies. In such a case, the daily seasonal frequency may be identified as a seasonal frequency for the data set. Advantageously, selecting a smaller seasonal frequency can prevent subsequent identification of an incorrect seasonality based on generation of spurious peaks in subsequent iterations.

Upon identifying a particular seasonal frequency for the data set (e.g., the single remaining candidate seasonal frequency or a selected candidate seasonal frequency), the seasonal frequency identifying component 164 can initiate data decomposition (e.g., via the data decomposing component 165) of the data set using the identified seasonal frequency (e.g., as a seasonality parameter). An example of such a data decomposition process is described in more detail below with reference to the data decomposing component 165.

As described, the seasonal frequency identifying component 164 may identify that no candidate seasonal frequencies passed through all the filters. In this way, there are no remaining seasonal frequencies detected at a particular resolution of the data set. In cases in which no candidate seasonal frequencies pass through all of the filters, the seasonal frequency identifying component 164 can initiate and/or perform downsampling of the data set to perform seasonality frequency identification at another resolution of data. Downsampling generally refers to reducing the sampling rate. The data decomposing component 165 is generally configured to perform data decomposition. As described, upon identifying a particular seasonal frequency for the data set (e.g., the single remaining candidate seasonal frequency or a selected candidate seasonal frequency), the seasonal frequency identifying component 164 can initiate data decomposition of the data set using the identified seasonal frequency (e.g., as a seasonality parameter).

In accordance with performing data decomposition, a residual component is determined for the data points of the data set. That is, seasonal and trend components identified in the time series are removed, resulting in a residual component. The residuals are then used to perform another iteration of seasonal frequency identification. In this regard, the residual data can be provided to the candidate seasonal frequency identifier 161 for a new iteration of performing seasonal frequency identification.

In performing data decomposition, data is decomposed to extract characteristics, or patterns, of the data. The decomposition of time series data generally deconstructs the data into several data components, each representing one of the underlying categories of patterns. Such data components include trend, seasonal(s), and residual.

A trend component (at time t) generally refers to the long-term overall progression of a series of data points. For example, a trend can represent a persistent increasing or decreasing direction in the data. Identification of a trend component can facilitate analysis of sudden changes in a data set. In some cases, a trend component may encompass a cyclical behavior. For example, a data decomposition may decompose a data set into trend, seasonal, and residual components, wherein a cyclical component, if present in the data, is included in the trend. A cyclical component (at time t) generally refers to repeated but non-periodic fluctuations.

A seasonal component (at time t) generally refers to seasonality, or cyclic seasonal variation. A seasonal pattern can represent when a data set (e.g., time series data set) is influenced by seasonal factors. Seasonality can occur over a fixed period (e.g., quarter of year, month, day of the week, etc.). Identification of a seasonal component can facilitate analysis of frequency changes in a data set. As described, data may reflect different seasonalities and, as such, embodiments described herein can identify multiple seasonal components that indicate the different seasonalities.

A residual component (at time t) generally refers to an irregular or "noise" component, which describes random, irregular influences. A residual component represents the residuals or remainder of a data set (e.g., time series) after other components (e.g., trend and seasonal(s)) have been removed. Identification of a residual component can facilitate identification of anomalies. In this regard, upon removing trend and seasonality from data, anomalies can more easily (e.g., accurately and efficiently) be identified.

In embodiments, the data decomposing component 165 includes a trend identifier, a seasonality identifier, and a residual identifier. In this regard, to determine trend, seasonal, and residual components, a trend identifier, seasonal identifier, and residual identifier may be used. The trend identifier is generally configured to identify or determine a trend. In particular, the trend identifier can determine a trend (e.g., initial trend, intermediate trend, and/or final trend) for a particular data point. The trend identifier can be implemented to determine a trend in any number of ways. As one example, a kernel smoothing filter technique can be used to identify a trend component. The seasonality identifier is generally configured to identify or determine seasonal(s) components. In particular, the seasonality identifier can determine seasonal(s) components (e.g., initial seasonality and/or final seasonality). Examples of determining seasonality(s) for a data point include utilization of a simple averages method, ratio to trend method, ratio-to-moving-average method, and link relatives method.

A residual identifier is generally configured to identify or determine a residual or remainder. The residual identifier can generally determine a residual for a data point by removing trend and seasonality from the data to arrive at a residual component. In this regard, the residual identifier can remove a final trend (e.g., identified via trend identifier) and a final seasonality (e.g., identified via seasonality identifier) to obtain a residual component for a data point.

The data decomposing component 165 can perform an iterative or recursive approach to identify more data components, including trend, seasonal, and residual components. Turning to the data provider 170, the data provider 170 is generally configured to provide the identified seasonal frequencies for the data set. As such, the identified seasonal frequencies can be provided for utilization in further data analysis.

Figure 2A:
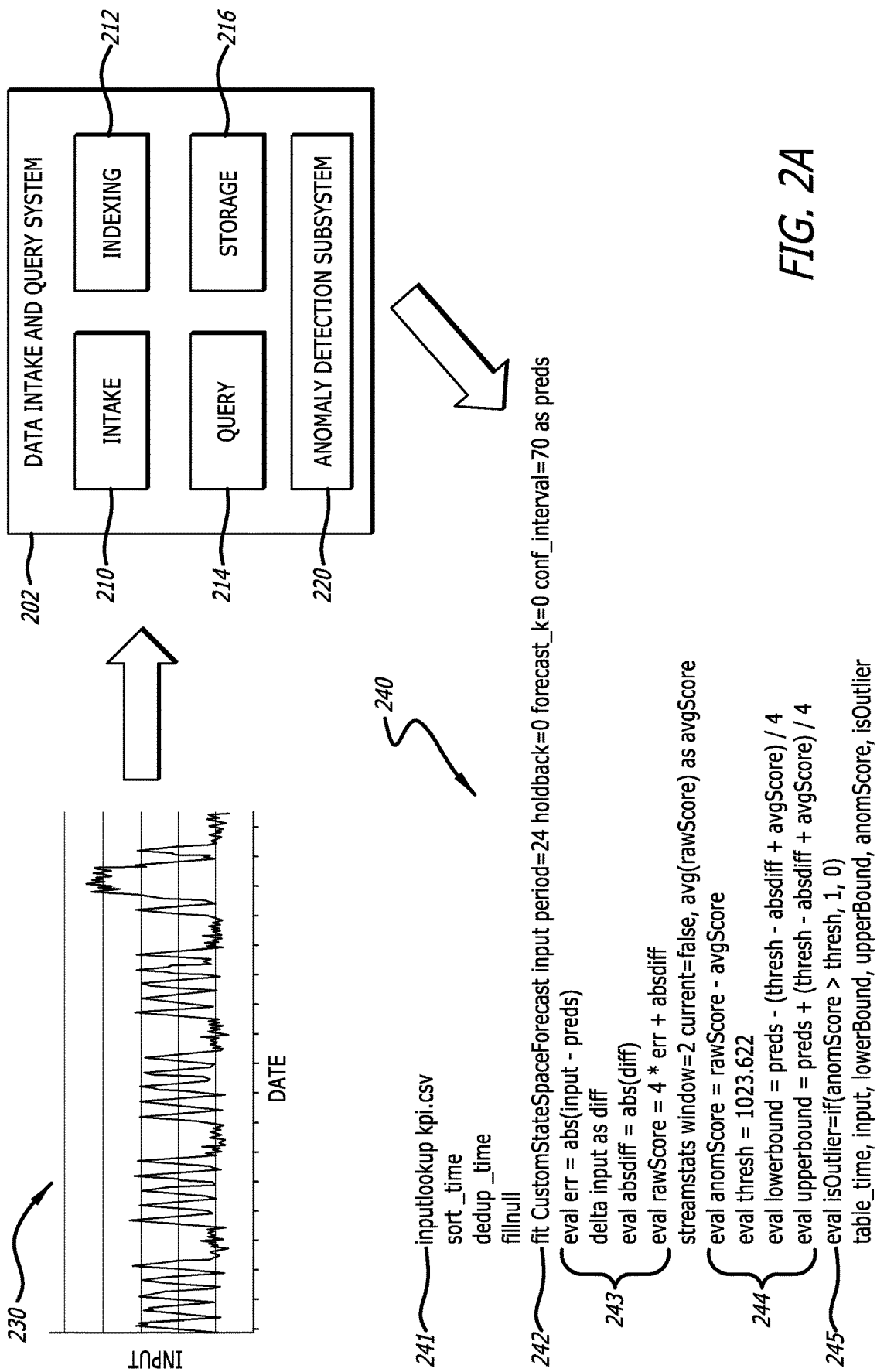
FIG. 2A is an illustrative example of a transformation of time-series data to an auto-tuned search query for anomaly detection performed by the anomaly detection logic of FIG. 1A.

FIG. 2A is an illustrative example of a transformation of time-series data to an auto-tuned search query for anomaly detection performed by the anomaly detection logic of FIG. 1A according to an embodiment of the disclosure. FIG. 2A provides an illustrative example of a time-series data stream 230, which may include data points at certain time intervals. For instance, the data points may represent values of a metric at a specific point in time, such as CPU usage. FIG. 2A further illustrates that the time-series data stream 230 is received by a data intake and query system 202, which includes an intake system 210, an indexing system 212, a query system 214, a storage system 216, and the anomaly detection subsystem 220, which correspond to the components discussed above with respect to FIG. 1A.

Additionally, FIG. 2A illustrates one implementation of the disclosure where the processing of the time-series data stream 230 by the anomaly detection system 220 results in the automated generation of a search query statement 240. The search query statement 240, upon execution, may be configured to perform anomaly detection on specified data. For instance, line 241 represents obtaining specified data, line 242 represents implementation of a forecasting machine learning algorithm to obtain predictions of each point, lines 243 represent obtaining an error value for each prediction, lines 244 represent determining a sensitivity threshold, and line 245 represents determining anomalies. The final line represents providing an output to a user.

Figure 2B:
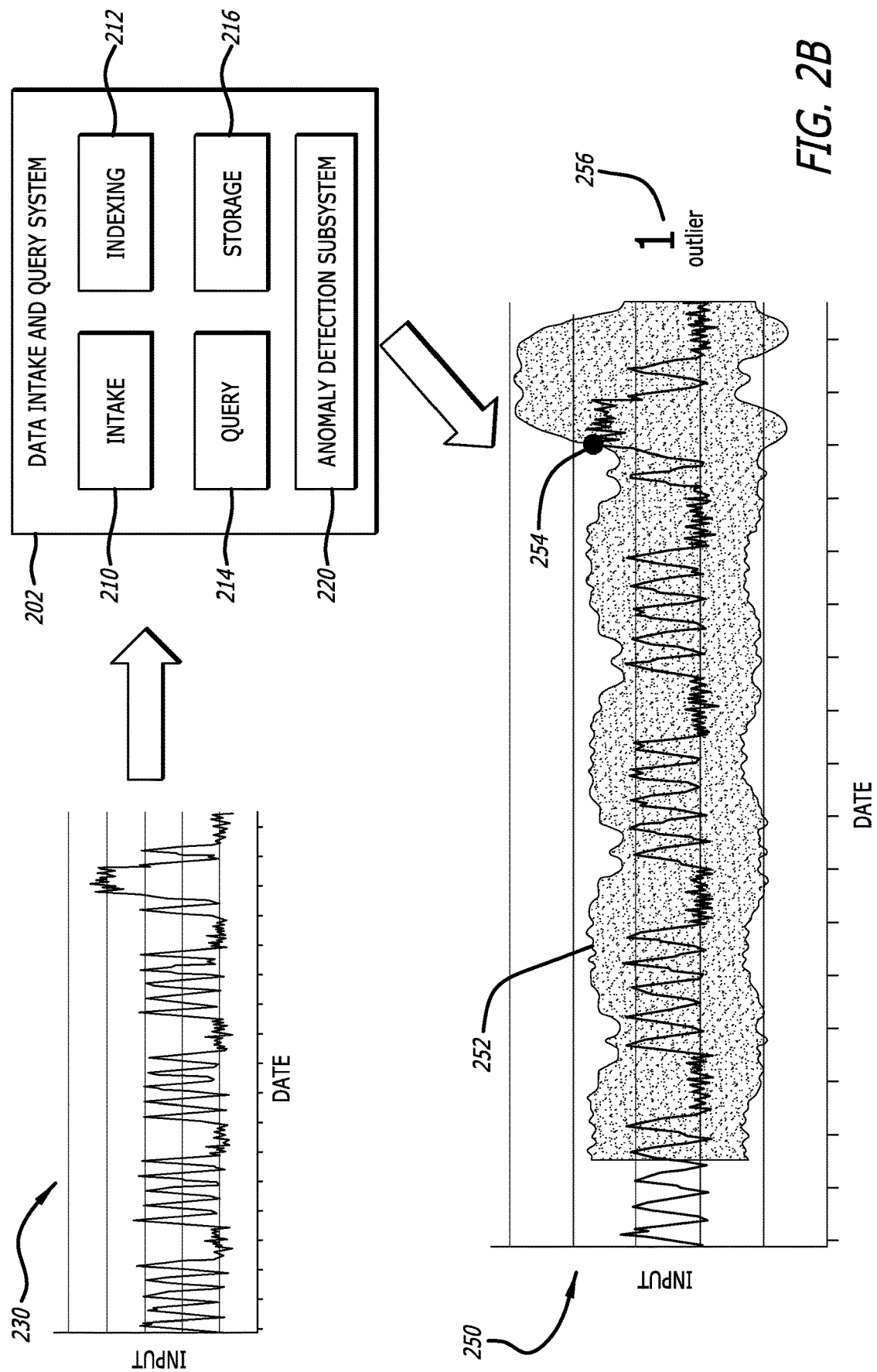
FIG. 2B is a sample graphical representation of an output of results of the execution of the auto-tuned search query for anomaly detection of FIG. 2A.

FIG. 2B is a sample graphical representation of an output of results of the execution of the auto-tuned search query for anomaly detection of FIG. 2A according to an embodiment of the disclosure. FIG. 2B provides a similar illustration as FIG. 2A in that the time-series data stream 230 is illustrated as being received or obtained by the data intake and query system 202. FIG. 2B provides an implementation that is either in an alternative or addition to that of FIG. 2A such that a graphical representation 250 of the time-series data stream 230 is presented to a user. In some examples, the graphical representation 250 may include a graphical plot of the time-series data stream 230 as well as an envelope 252 representing values of the time-series data stream 230 that have been determined to be benign (e.g., such that any data points within the envelope are not flagged as anomalies), any detected anomalies (e.g., anomaly 254), and an indication of the number of detected anomalies 256. It should be understood that the envelope 252 is based on the sensitivity threshold such that the envelope will vary based on user input to increase/decrease sensitivity of the anomaly detection.

Thus, FIGS. 2A-2B represent two possible practical applications of the inventive concepts of the disclosure: (1) an automatically generated search query statement 240 that is specifically configured to perform anomaly detection via a machine learning technique, to determine a sensitivity threshold, and to output an indication of detected anomalies, and (2) a graphical representation of an envelope of benign values and any detected anomalies. An additional practical application includes the training of a forecasting machine learning model through processing of the time-series data stream 230 by a machine learning algorithm of the anomaly detection system 220, which may be stored in the model storage 140 of FIG. 1A.

Figure 3:
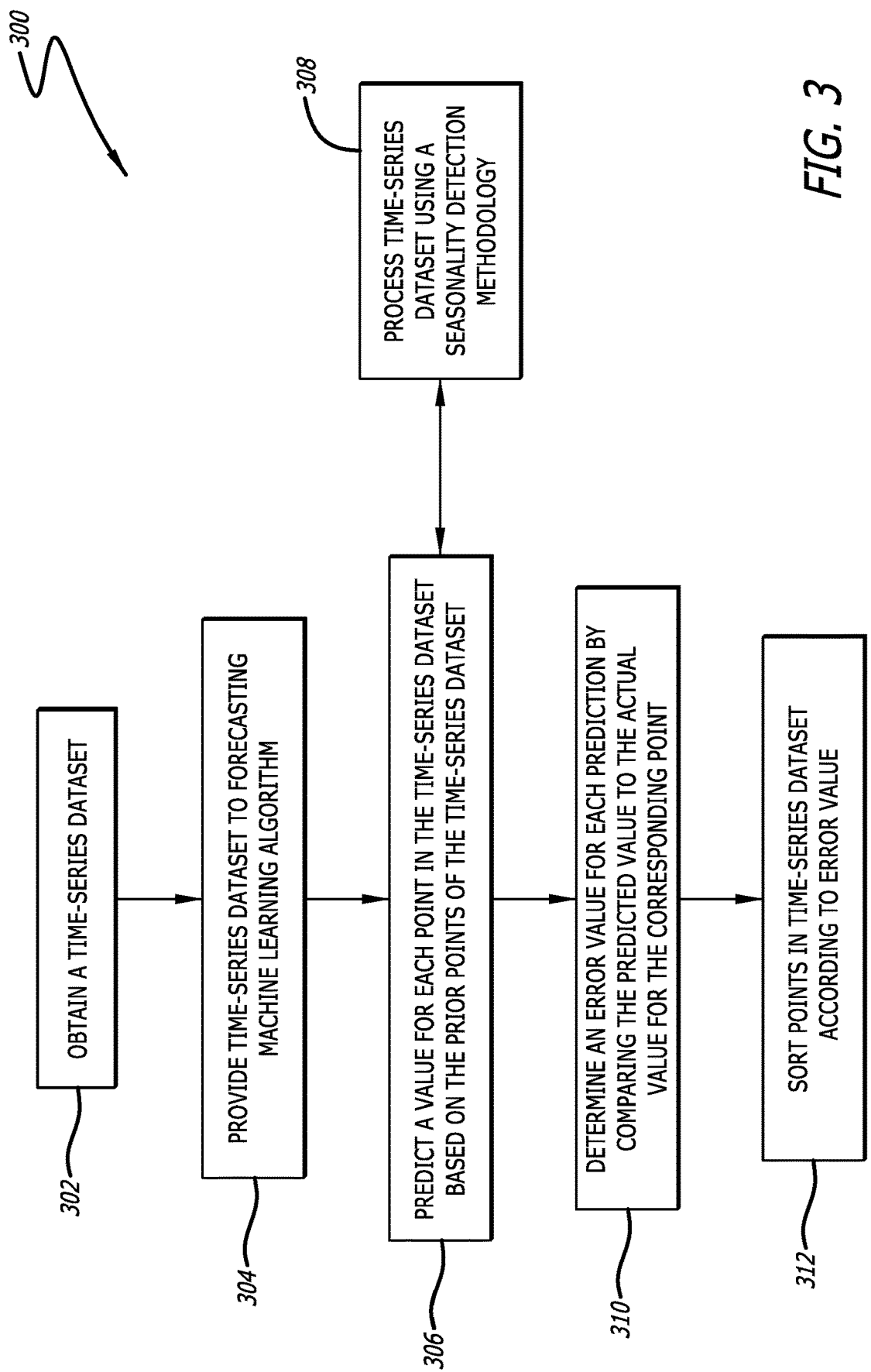
FIG. 3 is a flowchart illustrating an example method 300 of operations for training a machine learning model utilized in some implementations of the anomaly detection logic of FIG. 1A.

FIG. 3 is a flowchart illustrating an example method 300 of operations for training a machine learning model utilized in some implementations of the anomaly detection logic of FIG. 1A according to an embodiment of the disclosure. Each block illustrated in FIG. 3 represents an operation of the method 300. It should be understood that not every operation illustrated in FIG. 3 is required. In fact, certain operations may be optional to complete aspects of the method 300. The method 300 begins with an operation of obtaining a time-series dataset (such as the time-series data stream 130, 230) (block 302). The time-series dataset is provided to a machine learning algorithm, such as a forecasting machine learning algorithm, which processes the time-series dataset to predict a value for points in the time-series dataset based on the prior points of the time-series dataset (blocks 304, 306).

In some implementations, predicting the values for the points within the time-series dataset includes processing of the time-series dataset using a seasonality detection methodology (block 308). Once the values of the points of the time-series dataset have been predicted, an error value is determined for each prediction by comparing the predicted value to the actual value of the corresponding point and the points may then be sorted into a list according to the error value of the prediction of the point's value (blocks 310, 312). In some examples, the list may be sorted from greatest to lowest error value.

Operations of the method 300 will now be discussed in greater detail with various implementations described. In some examples, the user provides a time-series dataset or an indication as to a location of the time-series dataset on which anomaly detection is to be performed. Execution of the forecasting machine learning algorithm may include, for a current point, analyzing all prior points in the time-series dataset to determine a prediction of the current point. It should be understood that analyzing prior points and predicting a point refers to analyzing the values of prior points and predicting a value of the current point. For example, the algorithm uses the first point to predict the second; the first, and the second to predict the third: the first, second, third points to predict the fourth point, etc. Thus, as the model processes the time-series dataset in a sequential manner, predictions are made for each "next" point. While determining the predicted values, a machine learning model is also being trained, which in some examples may be saved for future use, e.g., in the model storage 140 of FIG. 1A. In some examples, for each time-series dataset that is received on which the anomaly detection process is to be performed, a new model is trained on that time-series dataset.

Based on the storage of trained models, in some implementations, a model trained on a first time-series dataset representing a metric over a first time period may be stored and utilized for anomaly detection on a second time-series dataset representing the same metric over a second time period (e.g., a second, subsequent time-period). In such implementations, training would include updating the previously trained model on the second time-series dataset, which would serve to decrease processing time by leveraging a pre-trained model. In other similar implementations, correlations may be determined between various metrics to determine a similarity measure, where time-series datasets for similar metrics would exhibit similar characteristics (e.g., particular spikes or other patterns). Metrics that correlate to at least a predetermined level of similarity may each utilize a pre-trained model (e.g., model trained on a time-series dataset of either of the metrics). Such implementations would also serve to decrease processing time by leveraging a pre-trained model and further assist with scalability by sharing pre-trained models amongst multiple metrics.

In some implementations, the forecasting machine learning algorithm discussed in block 304 includes a time-series forecasting algorithm. One implementation of a time-series forecasting algorithm may be based on Kalman filters that is configured to take a seasonality component as an input, where the seasonality component indicates a seasonality, trend, or pattern of a particular metric of a time-series dataset on which the anomaly detection process is to be executed. In some implementations, the seasonality component may be determined by the seasonal frequency engine 127 of FIGS. 1A-1B.

In some examples, a machine learning model utilizing Kalman filters includes features that are calculated and adjusted using historical time series data. Upon determining the features, the generated model can be used to calculate future predictions, such as but not limited to events. Any type of prediction model can be generated based on Kalman filtering. For example, a local level algorithm, a seasonal local level, a local level trend, a bivariate local level, or an algorithm combination can be based on the Kalman filter. As can be appreciated, other types or combinations of algorithms can be utilized to predict data associated with any number of future time intervals. Queries (e.g., including a predict command) may be used to initiate future predictions for time series data. That is, a query may initiate or trigger a prediction or forecasting of expected values based on previously recorded time series data.

Time series data may include and/or encode a series or sequence of discrete events. A particular event may be associated with one or more values encoded in the portion of time series data that encodes and/or is associated with the particular event. For example, each event encoded in time series data may include and/or be associated with a timestamp that indicates at least one of a time, date, and/or year associated with the event. As discussed throughout, events may include and/or be associated with one or more field-value pairs. In some embodiments, a field of an event may include the timestamp associated with the event. That is, the value of an event's associated timestamp may be encoded in the value portion of a field-value pair, where the field corresponds and/or is labeled as a timestamp field. Other values associated with the particular event may be encoded in additional field-value pairs for the particular event.

When forecasting expected values via a time series forecasting algorithm, treating all historical events similarly or equivalently, irrespective of their timestamps (or other associated values), may generate erroneous or inaccurate predictions. For example, the frequency of events occurring over a holiday (e.g., New Year's Day) may be attenuated, as compared to the frequency of events occurring on another day that is not a holiday. As such, forecasting a predicted frequency of "non-holiday" events based on historical "holiday" events may result in an erroneous or inaccurate predicted frequency. In another example, the number or volume of events occurring during a weekday may be significantly enhanced, as compared to the number or volume of events occurring during the weekend. Thus, forecasting a predicted number of "weekend" events based on historical "weekday" events may result in an erroneous predicted number. In still another example, the type and/or nature of an event occurring during business hours may be significantly different from the type and/or nature of an event occurring during the evening hours. Accordingly, forecasting a predicted type of "evening" event based on historical "day" events may result in an erroneous predicted event. Likewise, treating all historical events similarly or equivalently, irrespective of the values associated with other field-value pairs may result in an erroneous, inaccurate, or irrelevant forecast. Such other field-value pairs may include but are not limited to geolocation, IP addresses, a source and/or destination, a search query, customer ID, client ID, server, ID MAC address, user ID, or any other value associated with an event. For example, when a party is interested in forecasting events associated with a subset of customers, fitting time series data that includes events from all possible customers may provide irrelevant and/or inaccurate forecasting results, with respect to the interests of the party.

As discussed herein, the terms "event class," "event type," or "event category," are used interchangeably to serve as a classification and/or labeling of an event, via the values of one or more fields of the event. The time series forecasting algorithm may treat the historical events in each of the event types, classes, and/or categories separately. That is, a time series forecasting algorithm may subdivide historical events into various event classes and/or categories and weight the historical events separately based on the associated event class and/or category. Subdividing the historical events into event categories may be based on values encoded in the portion of the time series data that is associated with an event. Such values, of which the forecasting algorithm may take into account to classify the historical events include, but are not otherwise limited to a timestamp associated with an event, a type/event category associated with the event, or any other field/value associated with the event. In some embodiments, the historical events may be weighted based on a category associated with their timestamps.

In general, a time series forecasting algorithm that includes and/or employs a Kalman filter takes, as input, multiple observations or measurements of one or more variables (e.g., time series data encoding historical events). The historical time series data may include statistical noise or other sources of error. The Kalman filter generates a prediction and/or estimate of the one or more observed variables via the "noisy" input data. The weight associated with a particular historical event is an indication of the particular event's "importance" (and/or "impactfulness") in generating the prediction of the one or more variables. In addition to predicting an outcome for one or more variables associated with the time series data, the time series forecasting algorithm may predict meta information associated with the predicted outcome of the one or more variables. Such meta information (or metadata) associated with the predicted outcomes may include, but is not limited to a confidence parameter, confidence interval, confidence level, confidence window, error bar, statistical distribution, statistical metric (e.g., p-value), or other statistical indicator regarding the likely accuracy and/or precision of the prediction. When predicting such meta information about the predictions, the "importance" of the observed historical events may be determined via the weights. As discussed above, a time series forecasting algorithm (e.g., a Kalman filter) may weight historical events occurring on a holiday with a first weight and events occurring on a non-holiday with a second weight. Furthermore, separate holidays may be treated separately, i.e., not all holidays are treated equally and the historical events may be subdivided into multiple holiday event classes. For instance, a first weight may be assigned to events occurring on New Year's Day, a second weight may be assigned to events occurring on Independence Day, and a third weight may be assigned to events occurring during non-holidays.

In some embodiments, a combination of variables may be employed to discriminate, classify, and weight the historical events. That is, the time series forecasting may be multivariate time series forecasting. Any combination of values of the variables may be employed to classify and assign weight to the historical events. For example, historical events associated with a first IP address and a first holiday may be classified as a first event category and be weighted via a first weight, historical events associated with a second IP address and a second holiday may be classified as a second event category and be weighted via a second weight, and historical events associated with a third IP address and a third holiday may be classified as a third event category and be weighted via a third weight. Any logical combinations of conditions on one or more values associated with an event may be combined to discriminate, classify, and weight events.

A predictive or forecast model may be trained via machine learning, to predict future events. The observed time series data is used as training data. In some embodiments, supervised machine learning is used, where the time series data provides labeled training data. For example, a first batch of time series data may be received, that includes both "holiday" and "non-holiday" events. Once trained as discussed above, the model (which includes optimized weights for the various event classes), may be persisted and employed as new real-time time series data becomes available. The trained model may be employed to generate future event predictions based on real-time events, as the real-time events become available. As a non-limiting example, "Monday" and "Tuesday" events may be observed for each Monday of a calendar year. As discussed above, this historical time series data may be employed to train a model to forecast "Monday" and "Tuesday" events by determining optimized weights for "Monday" and "Tuesday" events. The model may be persisted and/or stored for use in future years.

Other examples of machine learning forecasting models include but are not limited or restricted to, artificial neural networks, random forest, Gaussian processes', generalized regression neural networks, support vector regression, K-nearest neighbors regression, long short-term-memory-based neural network, classification and regression trees (CART). The seasonality detection methodology referred to in block 308 is discussed in detail above with respect to FIG. 2B.

Referring to block 310, an error value is determined for each point by determining a difference between the predicted value and the actual value within the time-series dataset. As will be discussed below, the error values are utilized to determine whether each particular point should be categorized as an anomaly (or an "anomalous point").

Figure 4A:
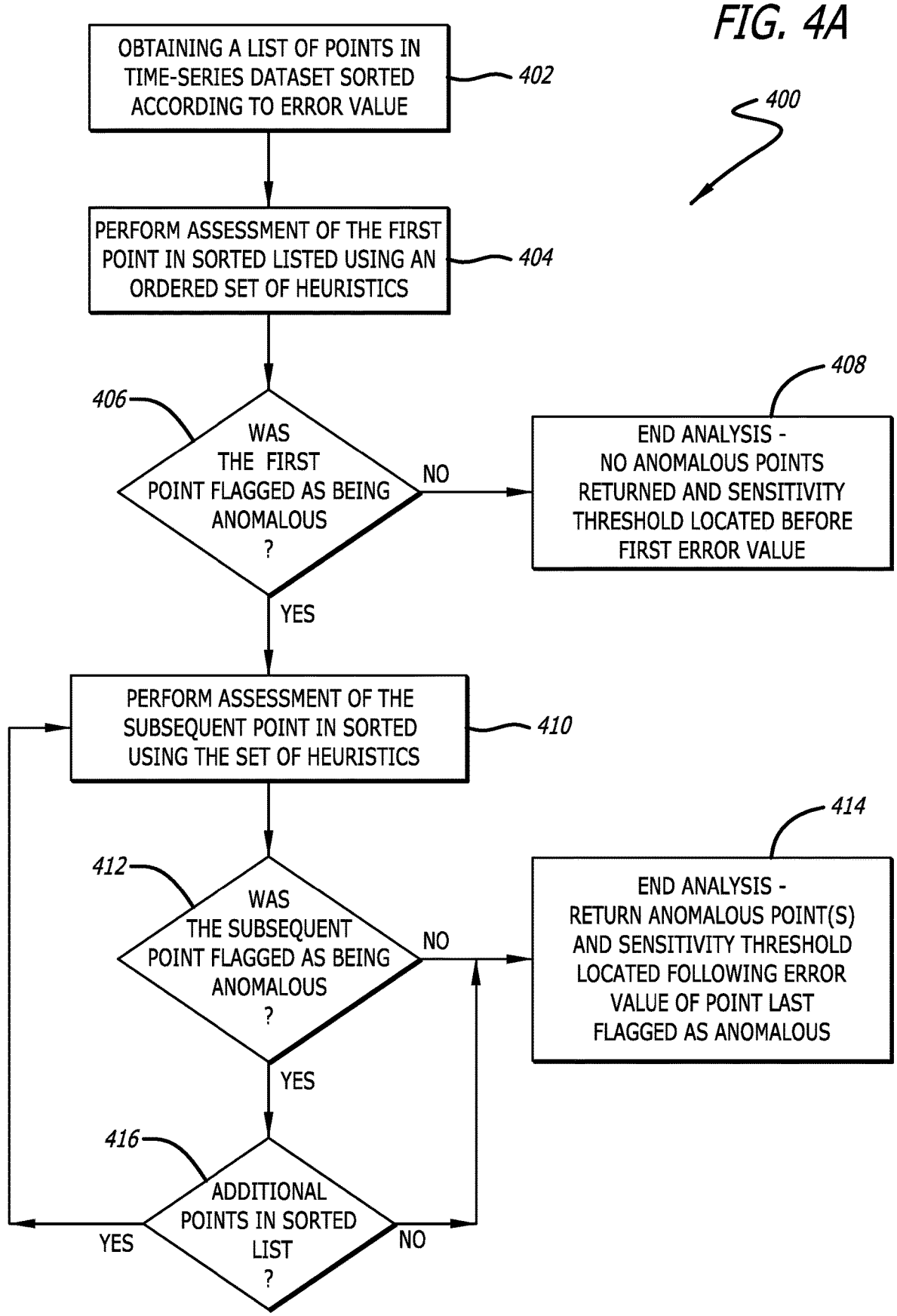
FIG. 4A is a flowchart illustrating an example method 400 of operations for determining a sensitivity threshold utilized in the auto-tuning of a search query generated by the anomaly detection logic of FIG. 1A.
Figure 4B:
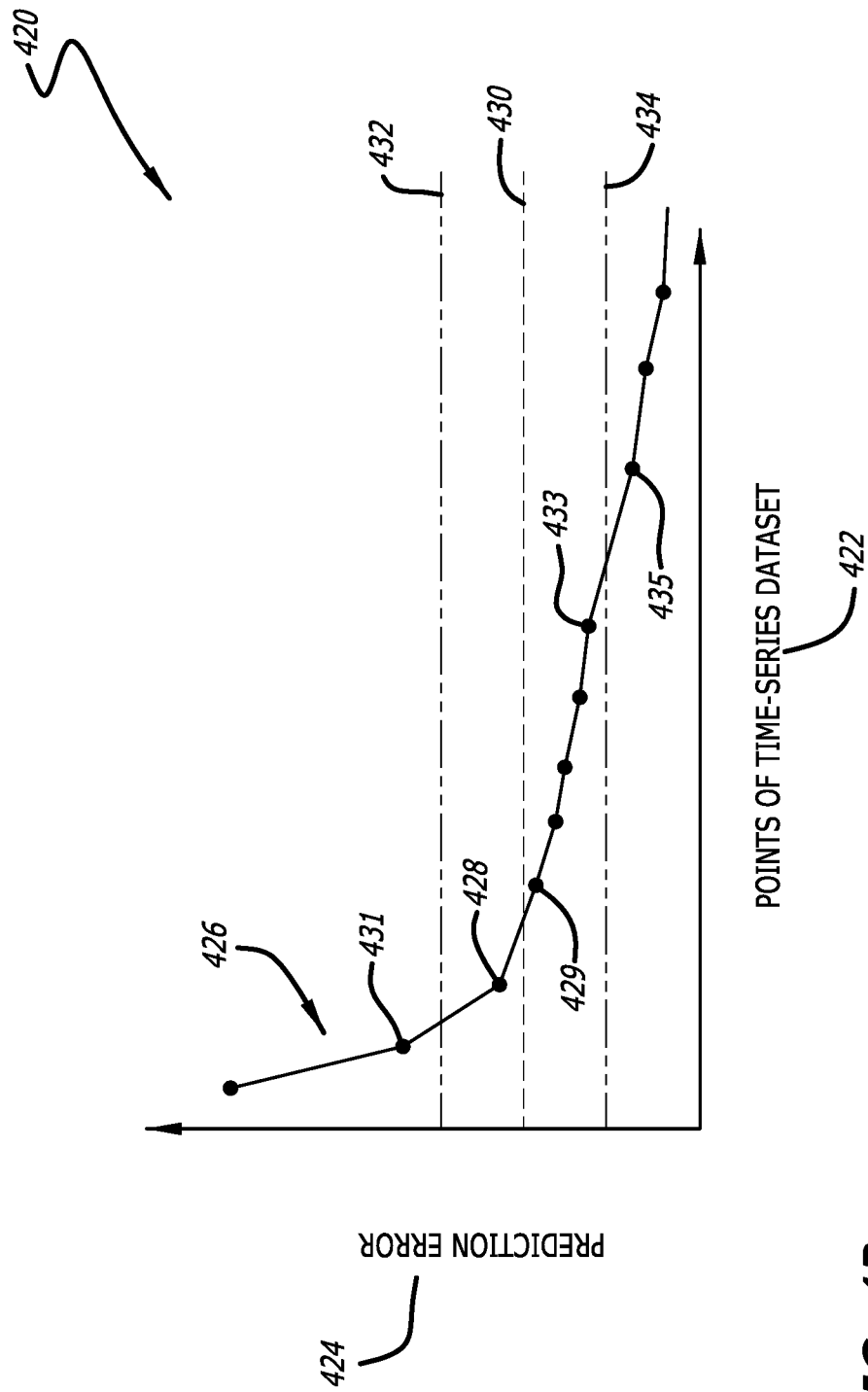
FIG. 4B is an illustration of an example plot of points of a time-series dataset according to an associated prediction error.

FIG. 4A is a flowchart illustrating an example method 400 of operations for determining a sensitivity threshold utilized in the auto-tuning of a search query generated by the anomaly detection logic of FIG. 1A according to an embodiment of the disclosure. Each block illustrated in FIG. 4A represents an operation of the method 400. It should be understood that not every operation illustrated in FIG. 4A is required. In fact, certain operations may be optional to complete aspects of the method 400. The method 400 begins with an operation of obtaining a list of points included within a time-series dataset, with the list being sorted according to an error value associated with a prediction of the value for each value (block 402). For example, the method 400 may represent operations performed following the method 300 and the list of points sorted according to error value represents the sorted list of block 312.

The method 400 continues with performing an assessment of the first point in the sorted list (e.g., associated with the greatest error value) using a set of heuristics, which result in an indication as to whether the first point is to be flagged an anomalous (blocks 404, 406). When the first point is not flagged as anomalous, the analysis ends. An indication may be returned to a user that no points were flagged as anomalous and a sensitivity threshold is placed above the first error value (block 408). For instance, the sensitivity threshold may be set as being greater than the first (greatest) error value. In some implementations, the sensitivity threshold is established as being greater than the largest error value by a small fraction of the dataset's range, for example, the difference between largest and smallest error values.

However, when the first point is flagged as being anomalous, the heuristic assessment is then performed on the next point in the sorted list (e.g., having the next greatest error value) (block 410). When the next point was not flagged as being anomalous, the analysis ends, and the anomalous point(s) are returned, and the sensitivity threshold is placed following the error value of the point last flagged as anomalous (blocks 412, 414). When the next point is flagged as being anomalous and additional points remain in the sorted list, the method 400 returns back to the block 410 and the next point is assessed using the set of heuristics (block 416). However, when no additional points remain in the sorted list, the method 400 ends the analysis and the anomalous point(s) are returned, and the sensitivity threshold is placed following the error value of the point last flagged as anomalous (block 416, 414).

Operations of the method 400 will now be discussed in greater detail with various implementations described. In some prior implementations, a search query statement may have been generated using a method that required the determination of two parameters (a sliding window length, and a sensitivity threshold), with the two parameters incorporated into a search query statement configured to perform anomaly detection. However, implementations of the current disclosure determine only one parameter (the sensitivity threshold). Implementations of the current disclosure improve upon previous disclosures as the forecasting machine learning algorithm used in some examples accounts for the entire history of each point of the time-series data as opposed to only a subset of points included within a window length resulting in a more accurate prediction. Additionally, some implementations of the current disclosure improve upon previous disclosures as the forecasting machine learning algorithm used in some examples accounts the seasonality of the data, as the forecasting machine learning algorithm results in a more complex model so as to be better able to capture historical patterns and correlations.

Referring to blocks 406-414 and specifically the determination of the sensitivity threshold, the algorithm (or model, when trained) is run on the time-series dataset to obtain the predicted value for each point and an error value between the predicted value and the actual value is then calculated. Next, the sensitivity threshold is determined by ranking each point in the time-series dataset by its error value (e.g., highest to lowest error value) and determining where to place the sensitivity threshold in the ranked list of points. For instance, the determination as to the sensitivity threshold requires a determination as to how many points are to be detected as anomalous (e.g., just the point having the greatest error value, the points having top two greatest error values, etc.).

In some examples, the determination as to where the sensitivity threshold is to be placed is performed by an objective function, which includes assessing whether the point having the greatest value is an anomaly based on its error value: if not, no anomalies are returned; if so, the point with the greatest error value is returned as an anomaly and the point having the second greatest error value is assessed. The process continues until the objective function determines a point is not to be returned as an anomaly and returns all previous points in the ranked list as anomalies. The line delineating the anomalous points from the non-anomalous points is the sensitivity threshold. In some implementations, the value of the sensitivity threshold is the midpoint between the error of the last anomaly and the error of the first non-anomaly. For example, when the error of the last anomaly is 0.7 and the error of the first non-anomaly is 0.5, the threshold is set to 0.6.

In some implementations, the objective function is an assessment using a set of heuristics that assess various aspects of a point in the time-series dataset, where part of the assessment may be of the individual characteristics of the point and part of the assessment may be of multiple points (e.g., surrounding points). In some implementations, one or more heuristics may analyze the timing between potential anomalies such that the sensitivity threshold does not result in the indication of anomalies within a certain time threshold of each other (e.g., anomalies which are flagged within a certain time frame are often considered redundant by a user and are to be avoided). The "timing" between anomalies refers to the distance in the time series data between anomalies (e.g., not the timing between when the anomalies are detected). Thus, the heuristics discussed below assess potential sensitivity thresholds and the anomalies each would flag if applied to the time-series dataset.

In some implementations, one or more heuristics may analyze the timing of the increase/decrease of the input variable and the relation to the detection of anomalies. The sensitivity is to detect anomalies based on spikes (up or down) of the value of the input variable and not detect anomalies based on an increase/decrease in value over a long period of time. Thus, one heuristic may account for the correlation between the change in the value of data points over a certain time frame.

In some embodiments, the heuristics may analyze whether a particular value of a data point is a maximum or minimum that has been previously seen (either for all time or during a predetermined time frame). Such a heuristic may weigh whether to flag a data point as an anomaly when the value of the data point is a maximum or minimum over a time period (all time or predetermined time period).

Examples of heuristics may include, but are not limited or restricted to, the following. A first heuristic may, for each detected anomaly, result in adding a first bonus to a score of a corresponding sensitivity threshold in proportion to an absolute difference between the detected anomaly and its two adjacent data points. The intention of this first illustrative heuristic is to add a higher bonus for anomalies which are detected when the data set experiences a sudden rise or fall in value.

A second heuristic may, for each detected anomaly, result in adding a second bonus to the score inversely proportional to a difference in value between the detected anomaly and a most extreme value of the data set seen thus far. As used herein, the term "extreme" refers to either highs or lows (max or min) of data point values. For data point values that are higher than the average, these values are analyzed to determine how close each is to the data set's maximum value to date. For data point values that are lower than the average, these values are analyzed to determine how close each is to the data set's minimum value to date. The intention of this second illustrative heuristic is to add a higher bonus for anomalies that are detected when the data set approaches, or exceeds, its historical extremes.

A third heuristic may result in subtracting a first penalty from the score in inverse proportion to a sum of the temporal distance between two adjacent anomalies. Thus, greater penalties are enforced upon potential sensitivity thresholds that detect anomalies in close temporal succession. In some embodiments, a hard constraint may be imposed against any two anomalies being raised too close to one another to reasonably correspond to distinct real-world incidents (e.g., "too close" referring to within a predetermined time threshold). This time threshold is adaptively determined based on the overall length of the data set, and potential sensitivity thresholds which violate it are given an objective function value of negative infinity (e.g., the lowest possible score, amounting to complete removal from consideration as a potential sensitivity threshold).

A fourth heuristic may result in subtracting a second penalty from the score proportional to an overall number of detected anomalies. The provided heuristic examples are intended to be illustrative and not limiting. It should be recognized that any combination of various other heuristics and values applied to such heuristics may be applied.

In some embodiments, the scoring may have a preference for alerting on sharp "spikes" in the input variable (e.g., an increase or decrease in value between two adjacent data points beyond a particular threshold, which may be either a real number or a percentage of the value of the earlier in time data point with respect to the two adjacent data points), a preference for alerting upon unprecedented/extreme values of the metric, a preference against sending multiple alerts in close succession for a single anomalous event, and a preference against finding too many anomalies overall. As noted above, an objective function may be used that takes a potential sensitivity threshold as input and performs anomaly detection on the time series data using the potential sensitivity threshold, which results in the output of a score based on analysis of the detected anomalies.

The score may be modified by adding a bonus in proportion to the absolute differences between the anomaly and its two neighboring points, adding a bonus inversely proportional to the difference in value between the anomaly and the most extreme value of the series seen so far, subtracting a penalty in inverse proportion to the sum of the temporal distances between neighboring (adjacent) anomalies, and subtracting a penalty proportional to the overall number of detected anomalies. The choosing of the sensitivity may be done in a number of ways in different embodiments.

In other implementations not using the heuristics discussed above, the sensitivity threshold may initially be set to return a specific number of points on the ranked list (e.g., the points having the greatest X error values) or a specific error value threshold (e.g., all points having an error value about Y). In yet other implementations, the clustering method (e.g., the elbow method) may be utilized to determine the placement of the sensitivity threshold, as discussed above.

In other implementations, the determination of which points are to be returned as anomalous may be performed through the use of a trained classification machine learning model. In such implementations, a trained classification machine learning model classifies each point as anomalous or non-anomalous, which would also provide an indication as to the threshold delineating the anomalous and non-anomalous points. Such implementations would result in the utilization of a tiered or serial model approach, where a forecaster machine learning model is utilized to determine the prediction of each point and a classification machine learning model is utilized to determine a sensitivity threshold based on the error values calculated from the prediction of each point and the actual point value. In some implementations, the classification machine learning model that determines which points are to be retuned as anomalies may take into account user feedback (e.g., accounting for similar points that have been returned as anomalies in the past being indicated by users that the points were not anomalous and similarly not indicating similar points in the current time-series dataset as anomalous).

Figure 6:
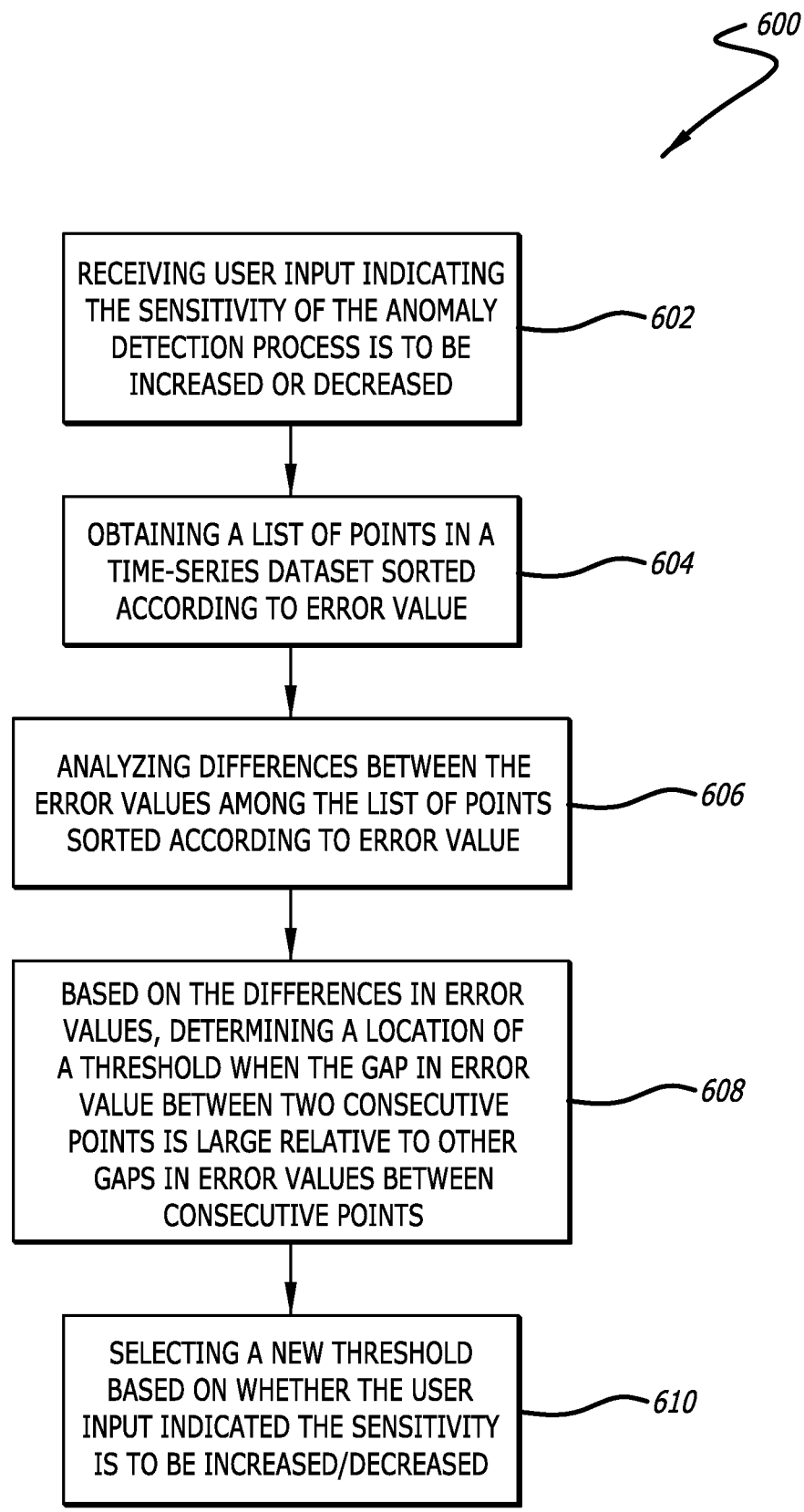
FIG. 6 is a flowchart illustrating an example method 600 of operations for determining additional sensitivity threshold utilized in re-tuning an auto-tuned search query generated by the anomaly detection logic of FIG. 1A through adjustment of the sensitivity threshold.

FIG. 4B is an illustration of an example plot of points of a time-series dataset according to an associated prediction error according to an embodiment of the disclosure. The example plot of FIG. 4B illustrates that the points of a time-series dataset 422 (in a sorted manner as discussed above) may be plotted on an x,y axis 420 according to the prediction error value associated with each point 424 resulting in the plotted line 426. The plotted line 426 may take the form of a curve such that an "elbow" is identifiable through a clustering heuristic. In FIG. 4B, the elbow may be identified as point 428 (e.g., the third point in the sorted list), such that the sensitivity threshold 430 is identified as being below the error value of point 428 and above point 429. Additionally, upon receipt of user input to alter the sensitivity of the anomaly detection, the elbow method may be utilized to determine the next threshold in either direction: (i) to decrease sensitivity, the next gap between consecutive points in an upward direction is determined (i.e., to increase the error value representing the threshold); and (ii) to increase sensitivity, the next gap between consecutive points in a downward direction is determined (i.e., to decrease the error value representing the threshold). In FIG. 4B, the adjustment of the sensitivity threshold is represented by a decreased sensitivity threshold 432 between points 428, 431, and an increased sensitivity threshold 434 between points 433, 435. FIG. 6 provides an alternative method for determining adjustment of the sensitivity threshold.

Figure 5:
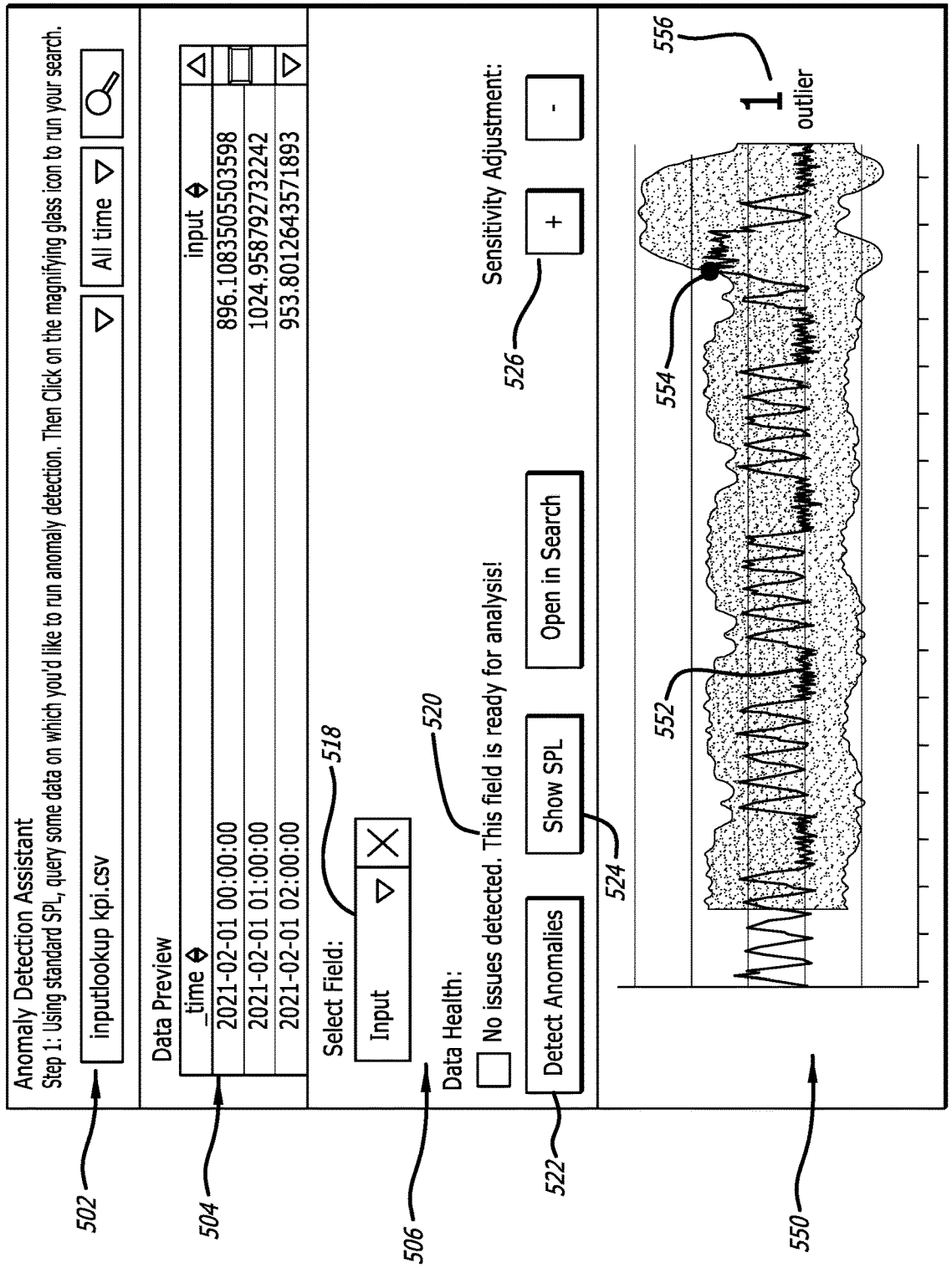
FIG. 5 is an example user interface configured to receive user input for and present results of an anomaly detection process performed by execution of an auto-tuned search query generated by the anomaly detection logic of FIG. 1A.

FIG. 5 is an example user interface configured to receive user input for and present results of an anomaly detection process performed by execution of an auto-tuned search query generated by the anomaly detection logic of FIG. 1A according to an embodiment of the disclosure. The graphical user interface (GUI) 500 of FIG. 5 includes a plurality of display sections 502, 504, 506, and 550. The GUI 500 may be one illustrative example as to how a user may utilize the functionality described herein. In particular, the display section 502 includes a text box that is configured to receive user input indicating a data source from which to obtain a time-series dataset or a location of a time-series dataset. In some implementations, the text box may be configured to receive user input in the form of a search query.

The display section 504 includes a preview of data points of the time-series dataset indicated in the display section 504. Display section 506 includes a user input component 518 that is configured to receive user input indicating a field of the data on which an anomaly detection is to be performed. In the implementation shown, the UI component 518 is a drop-menu but the disclosure is not intended to be so limited. The display section 506 further includes an indication as results of a health status check (indicator 520). The health status check is discussed in further detail below with respect to FIG. 7.

Additionally, the display section 506 include UI components 522, 524 (buttons) that are configured to receive user input activating the UI component with the button 522 representing an initiation of the anomaly detection process and the button 524 representing a visual of the search query statement that is executed to perform the anomaly detection (e.g., as shown in FIG. 2A). Further, the display section 506 includes the UI component set 526 (buttons) that are configured to receive user input indicating whether a sensitivity of the anomaly detection is to be increased or decreased, as discussed herein.

The display section 550 includes a graphical display (e.g., a plot) of the time-series dataset indicated in display section 502, an envelope 552 determined based on the sensitivity threshold as determined during the anomaly detection process, a detected anomaly 554, and an indication of the number of detected anomalies (indication 556).

FIG. 6 is a flowchart illustrating an example method 600 of operations for determining additional sensitivity thresholds utilized in re-tuning an auto-tuned search query generated by the anomaly detection logic of FIG. 1A through adjustment of the sensitivity threshold according to an embodiment of the disclosure. Each block illustrated in FIG. 6 represents an operation of the method 600. It should be understood that not every operation illustrated in FIG. 6 is required. In fact, certain operations may be optional to complete aspects of the method 600. The method 600 begins with an operation of receiving user input indicating that the sensitivity of an anomaly detection process is to be increased or decreased (block 602). For example, the anomaly detection process may involve the execution of a search query statement configured to perform anomaly detection (e.g., as seen in FIG. 2A) and the user input indicating the adjustment of the sensitivity may be via buttons 526 of FIG. 5.

Additionally, a list of points in a time-series dataset is obtained, where the list is sorted according to error value (block 604). In some implementations, the error values associated with the points may be obtained through determining a predicted value of a particular point through processing a forecasting machine learning algorithm and determining the error value between the predicted value and the actual value for the particular point.

Once the sorted list of points is obtained, the differences between the error values among the list of points may be analyzed (block 606). In one implementation, the sorted list of points is analyzed according to an assessment of the gap in error values of a group of three neighboring points. For example, given three neighboring points in the sorted list— x, y, z (with x having the greatest error value), a potential sensitivity threshold is placed between 'y' and 'z' when ('x'−'y')<('y'−'z'), as such indicates that 'y' and 'z' are far-apart relative to the preceding error gap. The assessment of determining whether ('x'−'y')<('y'−'z') is performed for each group of three points and all optional sensitivity thresholds are determined. It is noted that the ('x'−'y')< ('y'−'z') assessment method (or "inverted elbow" method) is distinguishable from the "elbow" method. Specifically, the elbow method detects as a large drop followed by relatively smaller drops in values. In contrast, the ('x'−'y')<('y'−'z') assessment method detects a small drop in value followed by a relatively larger drop.

Once the set of optional sensitivity thresholds has been determined, in one implementation, the placement of an initial sensitivity threshold as determined by the heuristic method described above with respect to FIGS. 4A-4B ("initial heuristic-based sensitivity threshold") is located (block 608). It is likely that the initial heuristic-based sensitivity threshold corresponds to an optional sensitivity threshold as determined by the ('x'−'y')<('y'−'z') assessment. However, in some rare instances, the initial heuristic-based sensitivity threshold may be located between two points where an optional sensitivity threshold was not placed according to the ('x'−'y')<('y'−'z') assessment. In other implementations, as an alternative to the use of the heuristic-based method described with respect to FIGS. 4A-4B, the initial sensitivity threshold may also be determined ('x'−'y')<('y'−'z') assessment. For example, the initial sensitivity threshold may be determined as the location in the sorted list at which the difference between ('x'−'y')<('y'−'z') is the largest). After determining the location of the initial sensitivity threshold, an optional sensitivity threshold is selected as the revised threshold, where the optional sensitivity threshold is either greater than or less than the initial sensitivity threshold (block 610). In some implementations, the immediately neighboring threshold is selected. In other implementations, the optional sensitivity located at a point in the sorted listed having the next greatest difference between ('x'−'y')<('y'−'z') is selected. In some embodiments, a penalty term may be utilized to bias the threshold toward returning fewer anomalies. For example, when one optional sensitivity threshold results in flagging three additional points as anomalies (thus increasing the sensitivity) and a neighboring (more sensitive) threshold results in flagging 100 additional points as anomalies, the threshold flagging 100 additional points would be penalized when being considered as for selection as an optional threshold.

In yet alternative implementations, selection of a revised sensitivity threshold may include placing the revised sensitivity threshold in accordance with a predetermined number of points to add/remove from the detected anomalies as the adjustment of the sensitivity threshold. For example, if a user were to provide input to increase the sensitivity of the anomaly detection (e.g., to return additional points as anomalies), some implementations may alter the sensitivity threshold by moving the sensitivity threshold down the ranked list of points (ranked by error value) by a predetermined number of points (vice versa for decreasing the sensitivity).

The method 600 provides an advantage over current techniques of adjusting a sensitivity threshold utilized in a search query configured to perform anomaly detection. For instance, some implementations of an anomaly detection search query that require both a window length and a sensitivity threshold utilize a grid search to seek out candidate pairs (window length, sensitivity threshold) and run multiple iterations of the search query statement to obtain a spread of anomaly detection results. A set of heuristics may then be applied to determine which of the candidate pairs "optimally" performs the anomaly detection. When the sensitivity is to be adjusted in such implementations, the entire process of obtaining new candidate pairs and running the multiple iterations of the search query statement must be performed to obtain new results of the search query statements on which to apply heuristics and select a new candidate pair.

Differently, in implementations of this disclosure, the error values are derived a single time using a forecasting machine learning algorithm/model to obtain predictions and computing the error between a prediction and the corresponding error value. As the error values are independent of the sensitivity threshold, the algorithm/model does not have to be re-run when determining a new sensitivity threshold. Instead, to obtain a new sensitivity threshold, an analysis of the sorted error values is performed with a new sensitivity threshold being selected resulting in either returning more or less anomalies dependent on the user input.

Figure 7:
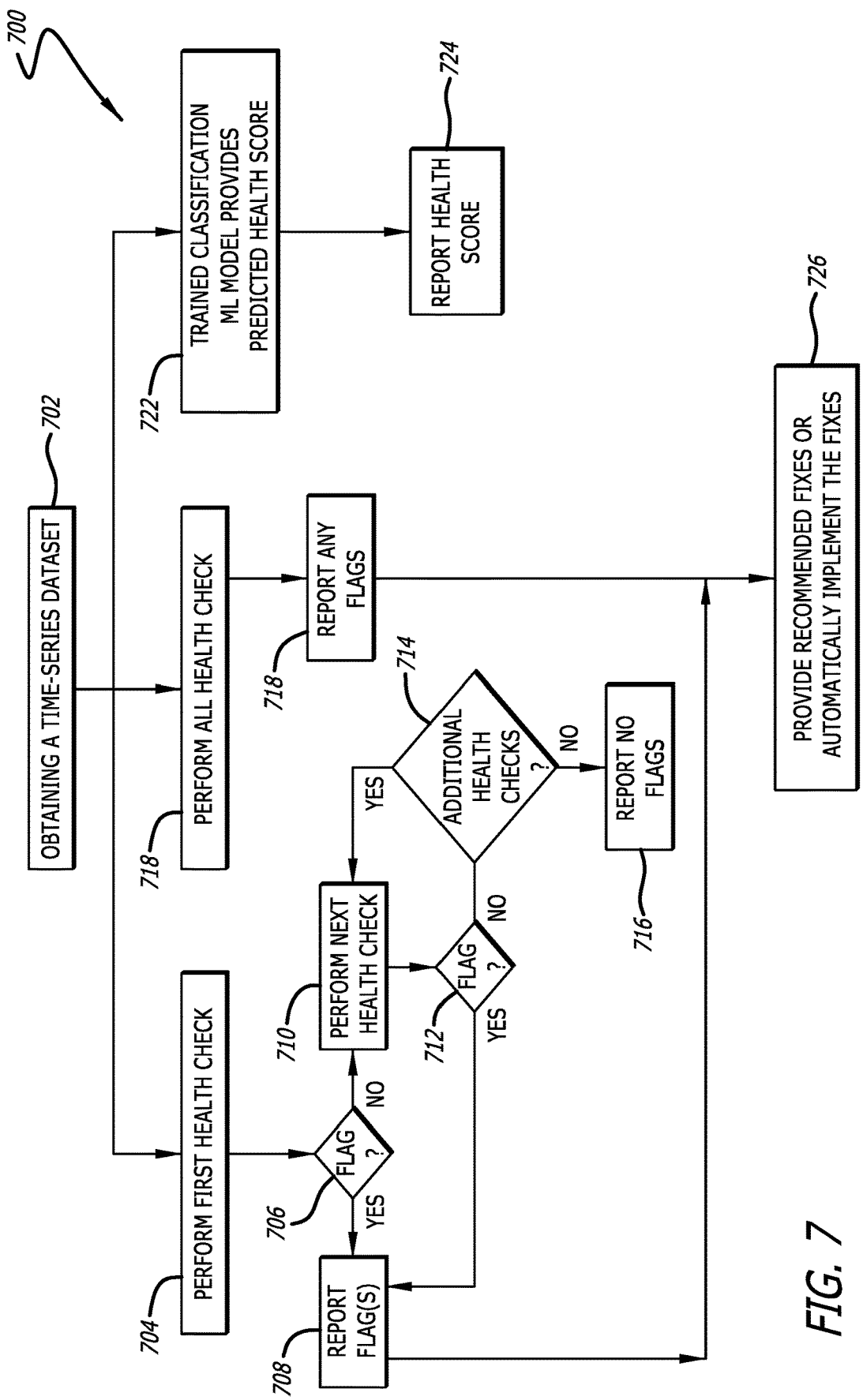
FIG. 7 is a flowchart illustrating an example method 700 of operations for performing a health status check procedure on data on which an anomaly detection procedure is to be performed.

FIG. 7 is a flowchart illustrating an example method 700 of operations for performing a health status check procedure on data on which an anomaly detection procedure is to be performed according to an embodiment of the disclosure. Each block illustrated in FIG. 7 represents an operation of the method 700. It should be understood that not every operation illustrated in FIG. 7 is required. In fact, certain operations may be optional to complete aspects of the method 700. The method 700 begins with an operation of obtaining a time-series dataset (block 702) and includes three possible paths, where each path represents a separate implementation.

A first implementation of the method 700 includes performing a series of health checks in an ordered manner such that when any health check results in a flag, the series of health checks ends, and the flag is reported to a user. In such an implementation the series of health checks may be ordered specifically to check for the most egregious error or issue first and continue down the order with less and less egregious errors or issues. The first implementation includes performing a first health check and determining whether the first health check resulted in a flag (blocks 704, 706). When a flag was thrown, the flag is reported to a user (block 708). However, when a flag is not thrown, the next health check is performed and determining whether the next health check resulted in a flag (blocks 710, 712). When a flag was thrown, the flag is reported to a user (block 708). When a flag is not thrown and an additional health check remains, the next health check is performed (blocks 714, 710). However, when a flag is not thrown and no additional health checks remain, no flags are reported (e.g., an indication that the data is ready for anomaly detection may be provided, see FIG. 5) (blocks 714, 716).

A second implementation of the method 700 includes performing all health checks in the series of health checks (block 718). Once all health checks have been performed, any flags that were thrown are reported to a user (or an indication that the data is ready for anomaly detection may be provided) (block 720). Following the reporting of any flags in the first and second implementations, recommended fixes may be provided that would cure the cause of the flag(s) and/or one or more fixes may be automatically implemented (block 726).

A third implementation of the method 700 includes utilizing a trained classification machine learning model that is configured to provide a predicted health score following analysis of the time-series dataset and reporting the predicted health score to a user (block 722).

Operations of the method 700 will now be discussed in greater detail with various implementations described. Referring to the first and second implementations, the series of health checks may be comprised of an ordered set of rule statements, each analyzing a certain aspect of the time-series dataset. One advantage of utilizing the set of rule statements is that the defined rules provide the system and method the ability to tell a user what the issue is. In the first implementation, the most egregious issue is reported to the user while the second implementation provides all issues detected by the series of health checks. Referring to the third implementation, a classification machine learning model may be trained on labeled data to classify the time-series dataset as a whole into a plurality of categories (e.g., high-quality, medium, low-quality).

In some examples and with reference to block 726, the recommended fixes may include, but are not limited or restricted to, filling in blanks in the time-series data with a value of 0 or a value based on the surrounding/preceding points, or adding entries for missing timestamps, where the added entries may include values of 0 in each field or may be a duplicate of the previous entry (where an entry refers to datapoints of fields corresponding to a particular point in time). Additional example fixes include adding some randomness to points that have values of either 0 or 1 (e.g., alter the values slightly in random (e.g., 1, 0, 0, 1, 1, may correspond to 0.98, 0.002, 0, 0.85, 0.08)) or normalizing the time-series dataset to account for extreme differences in orders of magnitude that skew the anomaly detection analysis.

In some examples, the series of health checks may be ordered as follows from most to least egregious: (1) check for any missing and/or non-numeric values; (2) check that the timestamps are evenly-spaced; (3) check that there are sufficiently many unique values in the series to justify treating the data as a numeric and continuous-valued metric (e.g., if there are only the values 0 and 1, the variable is binary and not suited to time-series analysis), which involves binning the values and looking at the distribution of the bin counts; (4) check that the range of the time-series' values does not span too many orders of magnitude; (5) check that the series is relatively smooth, has some degree of structure and predictability, and is distinguishable from sheer random noise.

Figure 8:
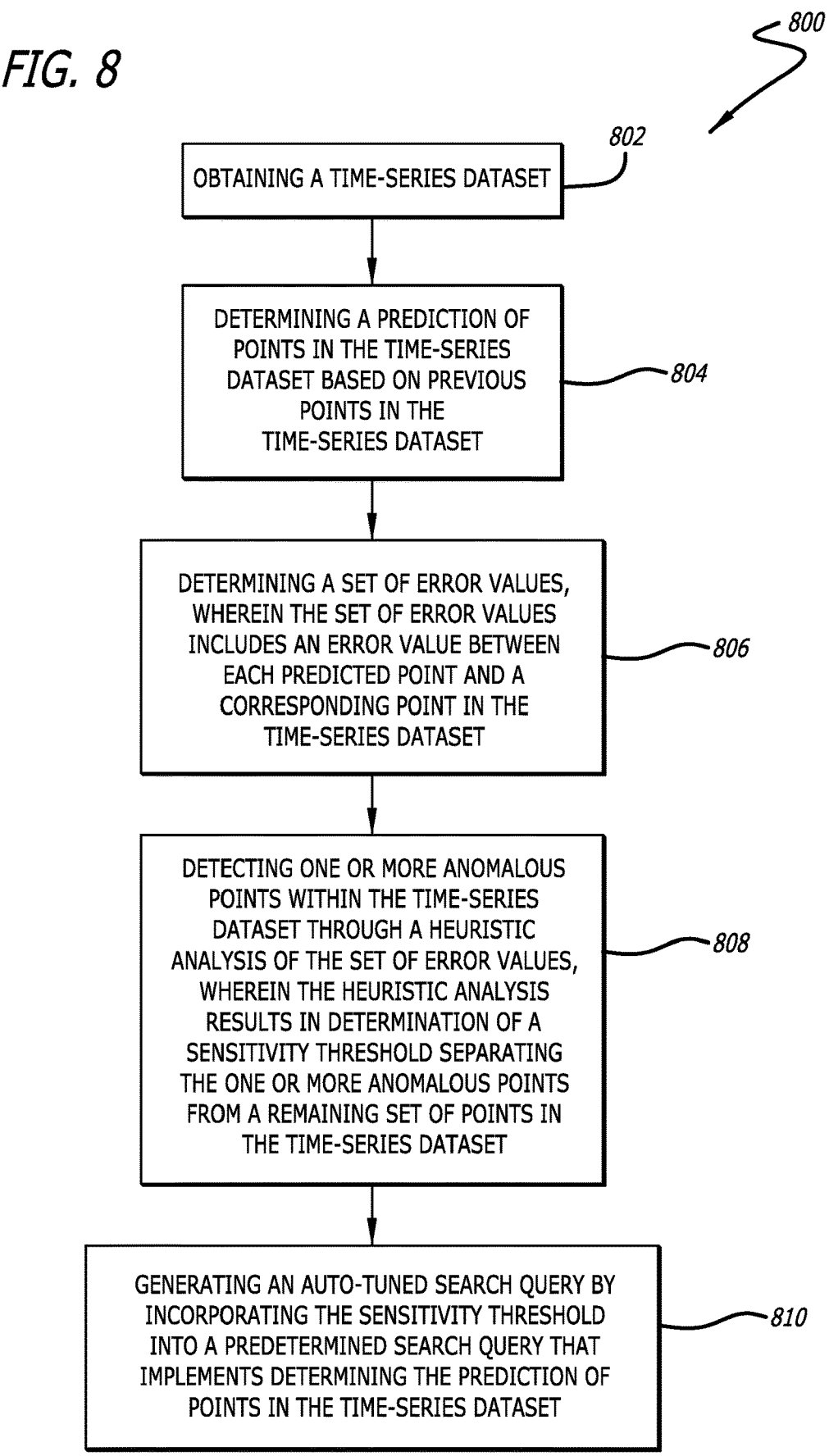
FIG. 8 is a flowchart illustrating an example process 800 of operations for performing an anomaly detection procedure within time-series data through execution of an auto-tuned search query generated by the anomaly detection logic of FIG. 1A.

FIG. 8 is a flowchart illustrating an example process 800 of operations for performing an anomaly detection procedure within time-series data through execution of an auto-tuned search query generated by the anomaly detection logic of FIG. 1A according to an embodiment of the disclosure. The example process 800 can be implemented, for example, by a computing device that comprises a processor and a non-transitory computer-readable medium. The non-transitory computer readable medium can be storing instructions that, when executed by the processor, can cause the processor to perform the operations of the illustrated process 800. Alternatively, or additionally, the process 800 can be implemented using a non-transitory computer-readable medium storing instructions that, when executed by one or more processors, case the one or more processors to perform the operations of the process 800 of FIG. 8.

Each block illustrated in FIG. 7 represents an operation of the process 800. It should be understood that not every operation illustrated in FIG. 8 is required. In fact, certain operations may be optional to complete aspects of the method 800. The method 800 begins with an operation of obtaining a time-series dataset and determining a prediction of points in the time-series dataset based on previous points in the times-series dataset (blocks 802, 804). Subsequently, a set of error values is determined, where the set of error values includes an error value between each predicted point and a corresponding point in the time-series dataset (block 806).

The process 800 continues with detecting one or more anomalous points within the time-series dataset through a heuristic analysis of the set of error values, where the heuristic analysis results in determination of a sensitivity threshold separating the one or more anomalous points from a remaining set of points in the time-series dataset (block 808). It should be understood that, depending on the time-series dataset, no anomalous points may be detected. Subsequently, an auto-tuned search query is generated by incorporating the sensitivity threshold into a predetermined search query that implements determining the prediction of the points in the time-series dataset (block 810).

In certain implementations, the above-disclosure includes (i) a computer-implemented method, (ii) a computing device including a processor and a non-transitory computer-readable medium having stored thereon instructions that, when executed by the processor, cause the processor to perform operations, and (iii) a non-transitory computer-readable medium having stored thereon instructions that, when executed by one or more processors, cause the one or more processor to perform operations. Further in certain detailed implementations, the operations of the method and those performed through execution of a processor include: obtaining a time-series dataset; determining a prediction of points in the time-series dataset based on previous points in the time-series dataset; determining a set of error values, wherein the set of error values includes an error value between each predicted point and a corresponding point in the time-series dataset; detecting one or more anomalous points within the time-series dataset through a heuristic analysis of the set of error values, wherein the heuristic analysis results in determination of a sensitivity threshold separating the one or more anomalous points from a remaining set of points in the time-series dataset; and generating an auto-tuned search query by incorporating the sensitivity threshold into a predetermined search query that implements determining the prediction of points in the time-series dataset.

In some examples, determining the prediction of the points in the time-series dataset includes execution of a forecasting machine learning algorithm. In some implementations, the forecasting machine learning algorithm identifying a set of candidate seasonal frequencies associated with the time-series dataset based on a set of auto-correlation function (ACF) peaks; applying a set of filters causing analysis the set of candidate seasonal frequencies and updating of the set of candidate seasonal frequencies by removing any candidate seasonal frequencies that fail a filter from the set of candidate seasonal frequencies; and identifying a candidate seasonal frequency of the updated set of candidate seasonal frequencies as the seasonality component for the time-series dataset. In some examples, execution of the forecasting machine learning algorithm generates a trained machine learning model configured to predict each point in the time-series dataset based on previous points in in the time-series dataset through performance of a training procedure by providing the forecasting machine learning algorithm with the time-series dataset as input, and wherein the trained machine learning model is stored in non-transitory, computer-readable medium. In some implementations, the operations further include: receiving user input indicating an adjustment to a sensitivity level in detecting the one or more anomalous points; performing a second heuristic analysis that results in determination of a second sensitivity threshold, wherein the second sensitivity threshold causes detection of either a greater or lesser number of detected anomalies than were detected previously; and generating a revised auto-tuned search query by incorporating the second sensitivity threshold into the predetermined search query that implements determining the prediction of points in the time-series dataset.

In some implementations, the heuristic analysis includes a mathematical optimization procedure resulting in selection of the one or more anomalies that represent a subset of predicted points being most anomalous. Additionally, the time-series dataset may be a set of values of variable that are ordered by a timestamp associated with each value of the set of values.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 9:
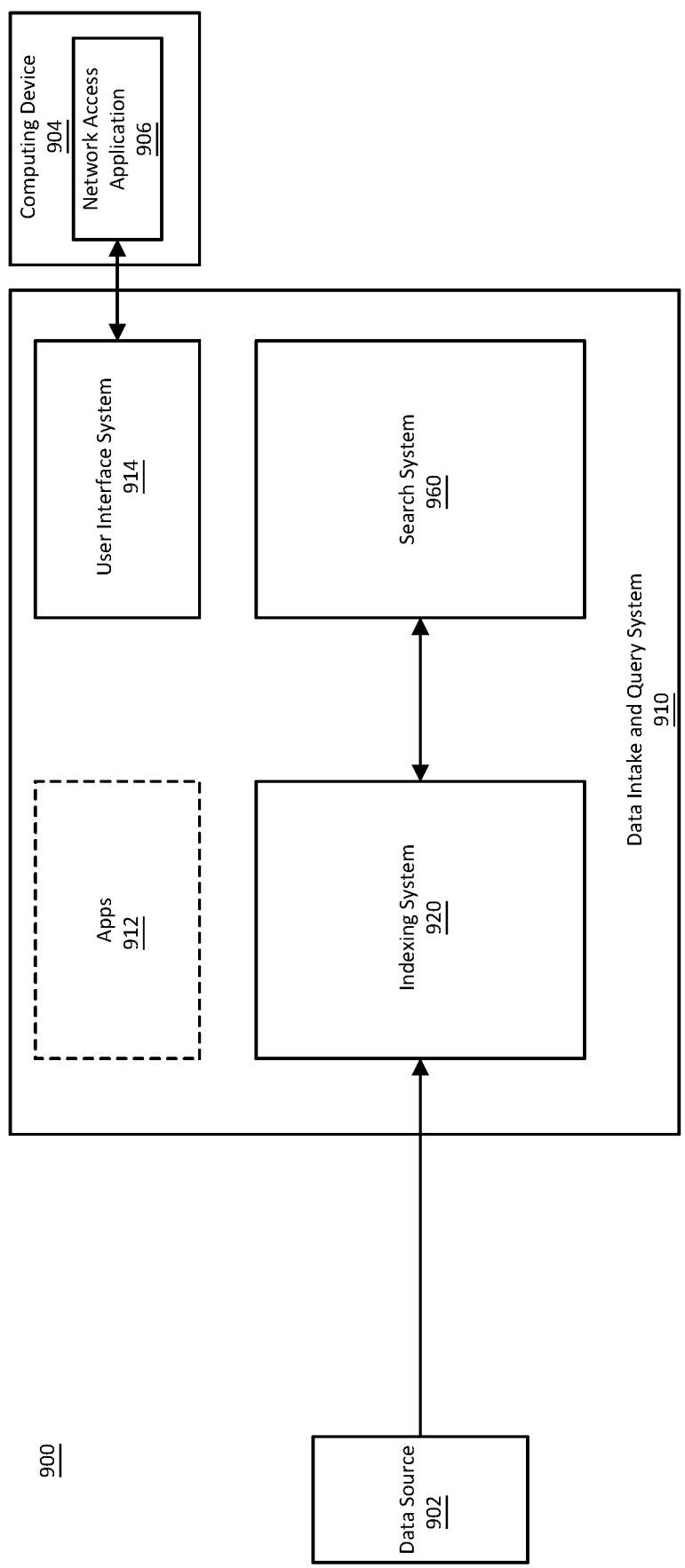
FIG. 9 is a block diagram illustrating an example computing environment that includes a data intake and query system.

FIG. 9 is a block diagram illustrating an example computing environment 900 that includes a data intake and query system 910. The data intake and query system 910 obtains data from a data source 902 in the computing environment 900, and ingests the data using an indexing system 920. A search system 960 of the data intake and query system 910 enables users to navigate the indexed data. Though drawn with separate boxes in FIG. 9, in some implementations the indexing system 920 and the search system 960 can have overlapping components. A computing device 904, running a network access application 906, can communicate with the data intake and query system 910 through a user interface system 914 of the data intake and query system 910. Using the computing device 904, a user can perform various operations with respect to the data intake and query system 910, such as administration of the data intake and query system 910, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 910 can further optionally include apps 912 that extend the search, analytics, and/or visualization capabilities of the data intake and query system 910.

The data intake and query system 910 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 910 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 910 can be executed on a single computing device, or execution of the program code can be distributed over multiple computing devices. For example, the program code can include instructions for both indexing and search components (which may be part of the indexing system 920 and/or the search system 960, respectively), which can be executed on a computing device that also provides the data source 902. As another example, the program code can be executed on one computing device, where execution of the program code provides both indexing and search components, while another copy of the program code executes on a second computing device that provides the data source 902. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 902 of the computing environment 900 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 902 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 920 obtains machine date from the data source 902 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 920 does not require prior knowledge of the structure of incoming data (e.g., the indexing system 920 does not need to be provided with a schema describing the data). Additionally, the indexing system 920 retains a copy of the data as it was received by the indexing system 920 such that the original data is always available for searching (e.g., no data is discarded, though, in some examples, the indexing system 920 can be configured to do so).

The search system 960 searches the data stored by the indexing 920 system. As discussed in greater detail below, the search system 960 enables users associated with the computing environment 900 (and possibly also other users) to navigate the data, generate reports, and visualize search results in "dashboards" output using a graphical interface. Using the facilities of the search system 960, users can obtain insights about the data, such as retrieving events from an index, calculating metrics, searching for specific conditions within a rolling time window, identifying patterns in the data, and predicting future trends, among other examples. To achieve greater efficiency, the search system 960 can apply map-reduce methods to parallelize searching of large volumes of data. Additionally, because the original data is available, the search system 960 can apply a schema to the data at search time. This allows different structures to be applied to the same data, or for the structure to be modified if or when the content of the data changes. Application of a schema at search time may be referred to herein as a late-binding schema technique.

The user interface system 914 provides mechanisms through which users associated with the computing environment 900 (and possibly others) can interact with the data intake and query system 910. These interactions can include configuration, administration, and management of the indexing system 920, initiation and/or scheduling of queries that are to be processed by the search system 960, receipt or reporting of search results, and/or visualization of search results. The user interface system 914 can include, for example, facilities to provide a command line interface or a web-based interface.

Users can access the user interface system 914 using a computing device 904 that communicates with data intake and query system 910, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 900. For example, a person can log in as a particular user and, using the user's digital information, can access the data intake and query system 910. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 904 can provide a human-machine interface through which a person can have a digital presence in the computing environment 900 in the form of a user. The computing device 904 is an electronic device having one or more processors and a memory capable of storing instructions for execution by the one or more processors. The computing device 904 can further include input/output (I/O) hardware and a network interface. Applications executed by the computing device 904 can include a network access application 906, such as a web browser, which can use a network interface of the client computing device 904 to communicate, over a network, with the user interface system 914 of the data intake and query system 910. The user interface system 914 can use the network access application 906 to generate user interfaces that enable a user to interact with the data intake and query system 910. A web browser is one example of a network access application. A shell tool can also be used as a network access application. In some examples, the data intake and query system 910 is an application executing on the computing device 906. In such examples, the network access application 906 can access the user interface system 914 without going over a network.

The data intake and query system 910 can optionally include apps 912. An app of the data intake and query system 910 is a collection of configurations, knowledge objects (a user-defined entity that enriches the data in the data intake and query system 910), views, and dashboards that may provide additional functionality, different techniques for searching the data, and/or additional insights into the data. The data intake and query system 910 can execute multiple applications simultaneously. Example applications include an information technology service intelligence application, which can monitor and analyze the performance and behavior of the computing environment 900, and an enterprise security application, which can include content and searches to assist security analysts in diagnosing and acting on anomalous or malicious behavior in the computing environment 900.

Though FIG. 9 illustrates only one data source, in practical implementations, the computing environment 900 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 900, the data intake and query system 910 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 900 can include on-prem and cloud-based computing resources, or only cloud-based resources. For example, an entity May have on-prem computing devices and a private cloud. In this example, the entity operates the data intake and query system 910 and can choose to execute the data intake and query system 910 on an on-prem computing device or in the cloud. In another example, a provider entity operates the data intake and query system 910 in a public cloud and provides the functionality of the data intake and query system 910 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 910. In some implementations, the entity providing the data intake and query system 910 is itself subscribing to the cloud services of a cloud service provider. As an example, a first entity provides computing resources under a public cloud service model, a second entity subscribes to the cloud services of the first provider entity and uses the cloud computing resources to operate the data intake and query system 910, and a third entity can subscribe to the services of the second provider entity in order to use the functionality of the data intake and query system 910. In this example, the data sources are associated with the third entity, users accessing the data intake and query system 910 are associated with the third entity, and the analytics and insights provided by the data intake and query system 910 are for purposes of the third entity's operations.

Figure 10:
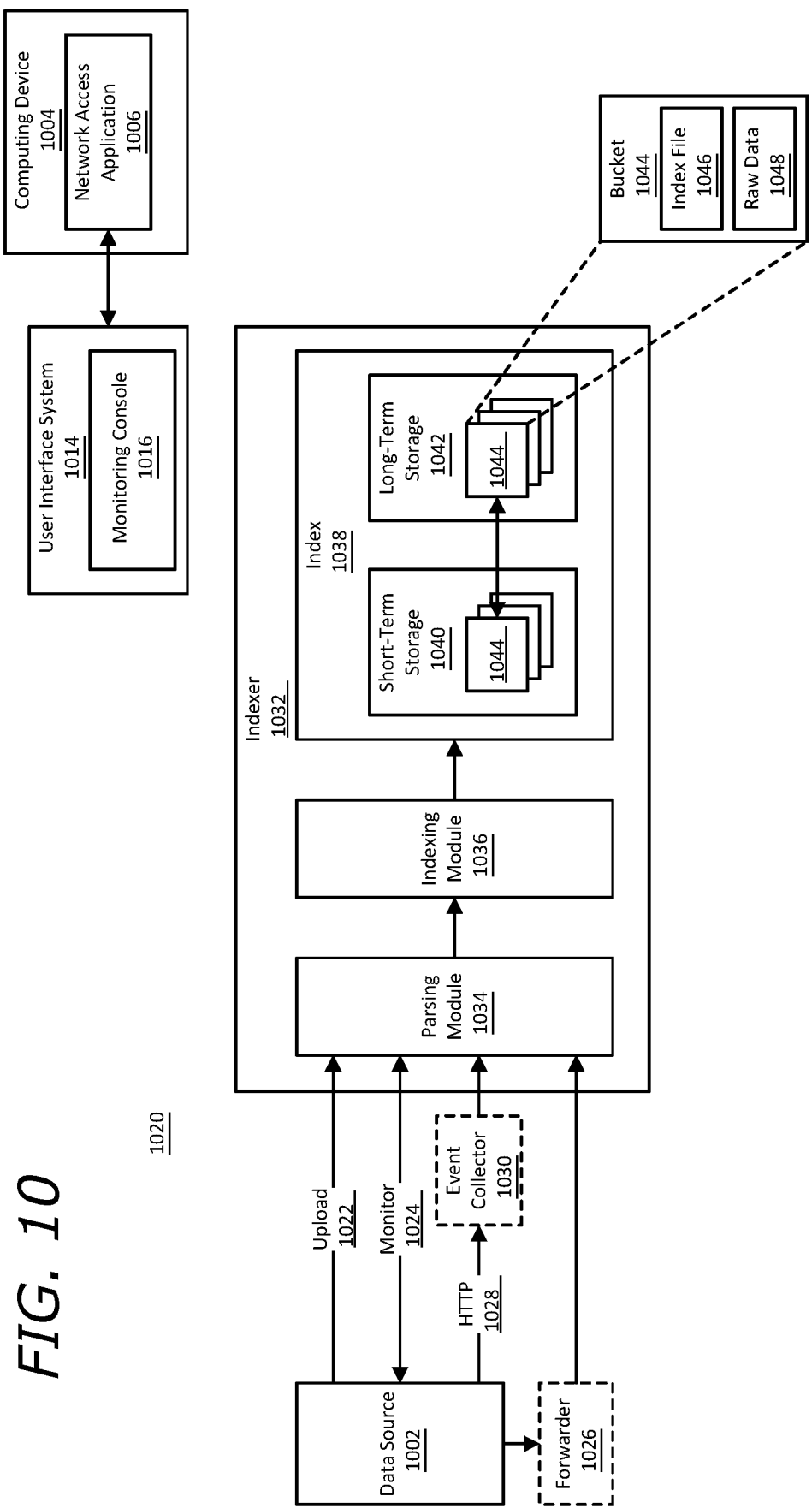
FIG. 10 is a block diagram illustrating in greater detail an example of an indexing system of a data intake and query system, such as the data intake and query system of FIG. 9.

FIG. 10 is a block diagram illustrating in greater detail an example of an indexing system 1020 of a data intake and query system, such as the data intake and query system 910 of FIG. 9. The indexing system 1020 of FIG. 10 uses various methods to obtain machine data from a data source 1002 and stores the data in an index 1038 of an indexer 1032. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1020 enables the data intake and query system to obtain the machine data produced by the data source 1002 and to store the data for searching and retrieval.

Users can administer the operations of the indexing system 1020 using a computing device 1004 that can access the indexing system 1020 through a user interface system 1014 of the data intake and query system. For example, the computing device 1004 can be executing a network access application 1006, such as a web browser or a terminal, through which a user can access a monitoring console 1016 provided by the user interface system 1014. The monitoring console 1016 can enable operations such as: identifying the data source 1002 for data ingestion; configuring the indexer 1032 to index the data from the data source 1032; configuring a data ingestion method; configuring, deploying, and managing clusters of indexers; and viewing the topology and performance of a deployment of the data intake and query system, among other operations. The operations performed by the indexing system 1020 may be referred to as "index time" operations, which are distinct from "search time" operations that are discussed further below.

The indexer 1032, which may be referred to herein as a data indexing component, coordinates and performs most of the index time operations. The indexer 1032 can be implemented using program code that can be executed on a computing device. The program code for the indexer 1032 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1032. In some implementations, the indexer 1032 executes on the computing device 1004 through which a user can access the indexing system 1020. In some implementations, the indexer 1032 executes on a different computing device than the illustrated computing device 1004.

The indexer 1032 may be executing on the computing device that also provides the data source 1002 or may be executing on a different computing device. In implementations wherein the indexer 1032 is on the same computing device as the data source 1002, the data produced by the data source 1002 may be referred to as "local data." In other implementations the data source 1002 is a component of a first computing device and the indexer 1032 executes on a second computing device that is different from the first computing device. In these implementations, the data produced by the data source 1002 may be referred to as "remote data." In some implementations, the first computing device is "on-prem" and in some implementations the first computing device is "in the cloud." In some implementations, the indexer 1032 executes on a computing device in the cloud and the operations of the indexer 1032 are provided as a service to entities that subscribe to the services provided by the data intake and query system.

For a given data produced by the data source 1002, the indexing system 1020 can be configured to use one of several methods to ingest the data into the indexer 1032. These methods include upload 1022, monitor 1024, using a forwarder 1026, or using HyperText Transfer Protocol (HTTP 1028) and an event collector 1030. These and other methods for data ingestion may be referred to as "getting data in" (GDI) methods.

Using the upload 1022 method, a user can specify a file for uploading into the indexer 1032. For example, the monitoring console 1016 can include commands or an interface through which the user can specify where the file is located (e.g., on which computing device and/or in which directory of a file system) and the name of the file. The file may be located at the data source 1002 or maybe on the computing device where the indexer 1032 is executing. Once uploading is initiated, the indexer 1032 processes the file, as discussed further below. Uploading is a manual process and occurs when instigated by a user. For automated data ingestion, the other ingestion methods are used.

The monitor 1024 method enables the indexing system 1002 to monitor the data source 1002 and continuously or periodically obtain data produced by the data source 1002 for ingestion by the indexer 1032. For example, using the monitoring console 1016, a user can specify a file or directory for monitoring. In this example, the indexing system 1002 can execute a monitoring process that detects whenever the file or directory is modified and causes the file or directory contents to be sent to the indexer 1032. As another example, a user can specify a network port for monitoring. In this example, a monitoring process can capture data received at or transmitting from the network port and cause the data to be sent to the indexer 1032. In various examples, monitoring can also be configured for data sources such as operating system event logs, performance data generated by an operating system, operating system registries, operating system directory services, and other data sources.

Monitoring is available when the data source 1002 is local to the indexer 1032 (e.g., the data source 1002 is on the computing device where the indexer 1032 is executing). Other data ingestion methods, including forwarding and the event collector 1030, can be used for either local or remote data sources.

A forwarder 1026, which may be referred to herein as a data forwarding component, is a software process that sends data from the data source 1002 to the indexer 1032. The forwarder 1026 can be implemented using program code that can be executed on the computer device that provides the data source 1002. A user launches the program code for the forwarder 1026 on the computing device that provides the data source 1002. The user can further configure the forwarder 1026, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1026 can provide various capabilities. For example, the forwarder 1026 can send the data unprocessed or can perform minimal processing on the data before sending the data to the indexer 1032. Minimal processing can include, for example, adding metadata tags to the data to identify a source, source type, and/or host, among other information, dividing the data into blocks, and/or applying a timestamp to the data . . . . In some implementations, the forwarder 1026 can break the data into individual events (event generation is discussed further below) and send the events to a receiver. Other operations that the forwarder 1026 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1030 provides an alternate method for obtaining data from the data source 1002. The event collector 1030 enables data and application events to be sent to the indexer 1032 using HTTP 1028. The event collector 1030 can be implemented using program code that can be executing on a computing device. The program code may be a component of the data intake and query system or can be a standalone component that can be executed independently of the data intake and query system and operates in cooperation with the data intake and query system.

To use the event collector 1030, a user can, for example using the monitoring console 1016 or a similar interface provided by the user interface system 1014, enable the event collector 1030 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1002 as an alternative method to using a username and password for authentication.

To send data to the event collector 1030, the data source 1002 is supplied with a token and can then send HTTP 1028 requests to the event collector 1030. To send HTTP 1028 requests, the data source 1002 can be configured to use an HTTP client and/or to use logging libraries such as those supplied by Java, JavaScript, and .NET libraries. An HTTP client enables the data source 1002 to send data to the event collector 1030 by supplying the data, and a Uniform Resource Identifier (URI) for the event collector 1030 to the HTTP client. The HTTP client then handles establishing a connection with the event collector 1030, transmitting a request containing the data, closing the connection, and receiving an acknowledgment if the event collector 1030 sends one. Logging libraries enable HTTP 1028 requests to the event collector 1030 to be generated directly by the data source. For example, an application can include or link a logging library, and through functionality provided by the logging library manage establishing a connection with the event collector 1030, transmitting a request, and receiving an acknowledgement.

An HTTP 1028 request to the event collector 1030 can contain a token, a channel identifier, event metadata, and/or event data. The token authenticates the request with the event collector 1030. The channel identifier, if available in the indexing system 1020, enables the event collector 1030 to segregate and keep separate data from different data sources. The event metadata can include one or more key-value pairs that describe the data source 1002 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1030 extracts events from HTTP 1028 requests and sends the events to the indexer 1032. The event collector 1030 can further be configured to send events to one or more indexers. Extracting the events can include associating any metadata in a request with the event or events included in the request. In these implementations, event generation by the indexer 1032 (discussed further below) is bypassed, and the indexer 1032 moves the events directly to indexing. In some implementations, the event collector 1030 extracts event data from a request and outputs the event data to the indexer 1032, and the indexer generates events from the event data. In some implementations, the event collector 1030 sends an acknowledgement message to the data source 1002 to indicate that the event collector 1030 has received a particular request form the data source 1002, and/or to indicate to the data source 1002 that events in the request have been added to an index.

The indexer 1032 ingests incoming data and transforms the data into searchable knowledge in the form of events. In the data intake and query system, an event is a single piece of data that represents activity of the component represented in FIG. 10 by the data source 1002. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1032 can include a parsing module 1034 and an indexing module 1036 for generating and storing the events. The parsing module 1034 and indexing module 1036 can be modular and pipelined, such that one component can be operating on a first set of data while the second component is simultaneously operating on a second sent of data. Additionally, the indexer 1032 may at any time have multiple instances of the parsing module 1034 and indexing module 1036, with each set of instances configured to simultaneously operate on data from the same data source or from different data sources. The parsing module 1034 and indexing module 1036 are illustrated in FIG. 10 to facilitate discussion, with the understanding that implementations with other components are possible to achieve the same functionality.

The parsing module 1034 determines information about incoming event data, where the information can be used to identify events within the event data. For example, the parsing module 1034 can associate a source type with the event data. A source type identifies the data source 1002 and describes a possible data structure of event data produced by the data source 1002. For example, the source type can indicate which fields to expect in events generated at the data source 1002 and the keys for the values in the fields, and possibly other information such as sizes of fields, an order of the fields, a field separator, and so on. The source type of the data source 1002 can be specified when the data source 1002 is configured as a source of event data. Alternatively, the parsing module 1034 can determine the source type from the event data, for example from an event field in the event data or using machine learning techniques applied to the event data.

Other information that the parsing module 1034 can determine includes timestamps. In some cases, an event includes a timestamp as a field, and the timestamp indicates a point in time when the action represented by the event occurred or was recorded by the data source 1002 as event data. In these cases, the parsing module 1034 may be able to determine from the source type associated with the event data that the timestamps can be extracted from the events themselves. In some cases, an event does not include a timestamp and the parsing module 1034 determines a timestamp for the event, for example from a name associated with the event data from the data source 1002 (e.g., a file name when the event data is in the form of a file) or a time associated with the event data (e.g., a file modification time). As another example, when the parsing module 1034 is not able to determine a timestamp from the event data, the parsing module 1034 may use the time at which it is indexing the event data. As another example, the parsing module 1034 can use a user-configured rule to determine the timestamps to associate with events.

The parsing module 1034 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1034 may be able to determine event boundaries from the source type associated with the event data, for example from a data structure indicated by the source type. In some implementations, a user can configure rules the parsing module 1034 can use to identify event boundaries.

The parsing module 1034 can further extract data from events and possibly also perform transformations on the events. For example, the parsing module 1034 can extract a set of fields (key-value pairs) for each event, such as a host or hostname, source or source name, and/or source type. The parsing module 1034 may extract certain fields by default or based on a user configuration. Alternatively, or additionally, the parsing module 1034 may add fields to events, such as a source type or a user-configured field. As another example of a transformation, the parsing module 1034 can anonymize fields in events to mask sensitive information, such as social security numbers or account numbers. Anonymizing fields can include changing or replacing values of specific fields. The parsing component 1034 can further perform user-configured transformations.

The parsing module 1034 outputs the results of processing incoming event data to the indexing module 1036, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1032 can be configured to identify searchable segments that are parts of fields, searchable segments that are entire fields, or both. The parsing module 1034 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1046, to find event data that matches a search query. In some implementations, segmentation can alternatively be performed by the forwarder 1026. Segmentation can also be disabled, in which case the indexer 1032 will not build a lexicon for the event data. When segmentation is disabled, the search system searches the event data directly.

Building index data structures generates the index 1038. The index 1038 is a storage data structure on a storage device (e.g., a disk drive or other physical device for storing digital data). The storage device may be a component of the computing device on which the indexer 1032 is operating (referred to herein as local storage) or may be a component of a different computing device (referred to herein as remote storage) that the indexer 1038 has access to over a network. The indexer 1032 can manage more than one index and can manage indexes of different types. For example, the indexer 1032 can manage event indexes, which impose minimal structure on stored data and can accommodate any type of data. As another example, the indexer 1032 can manage metrics indexes, which use a highly structured format to handle the higher volume and lower latency demands associated with metrics data.

The indexing module 1036 organizes files in the index 1038 in directories referred to as buckets. The files in a bucket 1044 can include raw data files, index files, and possibly also other metadata files. As used herein, "raw data" means data as when the data was produced by the data source 1002, without alteration to the format or content. As noted previously, the parsing component 1034 may add fields to event data and/or perform transformations on fields in the event data. Event data that has been altered in this way is referred to herein as enriched data. A raw data file 1048 can include enriched data, in addition to or instead of raw data. The raw data file 1048 may be compressed to reduce disk usage. An index file 1046, which may also be referred to herein as a "time-series index" or tsidx file, contains metadata that the indexer 1032 can use to search a corresponding raw data file 1048. As noted above, the metadata in the index file 1046 includes a lexicon of the event data, which associates each unique keyword in the event data with a reference to the location of event data within the raw data file 1048. The keyword data in the index file 1046 may also be referred to as an inverted index. In various implementations, the data intake and query system can use index files for other purposes, such as to store data summarizations that can be used to accelerate searches.

A bucket 1044 includes event data for a particular range of time. The indexing module 1036 arranges buckets in the index 1038 according to the age of the buckets, such that buckets for more recent ranges of time are stored in short-term storage 1040 and buckets for less recent ranges of time are stored in long-term storage 1042. Short-term storage 1040 may be faster to access while long-term storage 1042 may be slower to access. Buckets may be moves from short-term storage 1040 to long-term storage 1042 according to a configurable data retention policy, which can indicate at what point in time a bucket is old enough to be moved.

A bucket's location in short-term storage 1040 or long-term storage 1042 can also be indicated by the bucket's status. As an example, a bucket's status can be "hot," "warm," "cold," "frozen," or "thawed." In this example, hot bucket is one to which the indexer 1032 is writing data and the bucket becomes a warm bucket when the index 1032 stops writing data to it. In this example, both hot and warm buckets reside in short-term storage 1040. Continuing this example, when a warm bucket is moved to long-term storage 1042, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1020 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1020 through the monitoring console 1016 provided by the user interface system 1014. Using the monitoring console 1016, the user can configure and monitor an index cluster, and see information such as disk usage by an index, volume usage by an indexer, index and volume size over time, data age, statistics for bucket types, and bucket settings, among other information.

Figure 11:
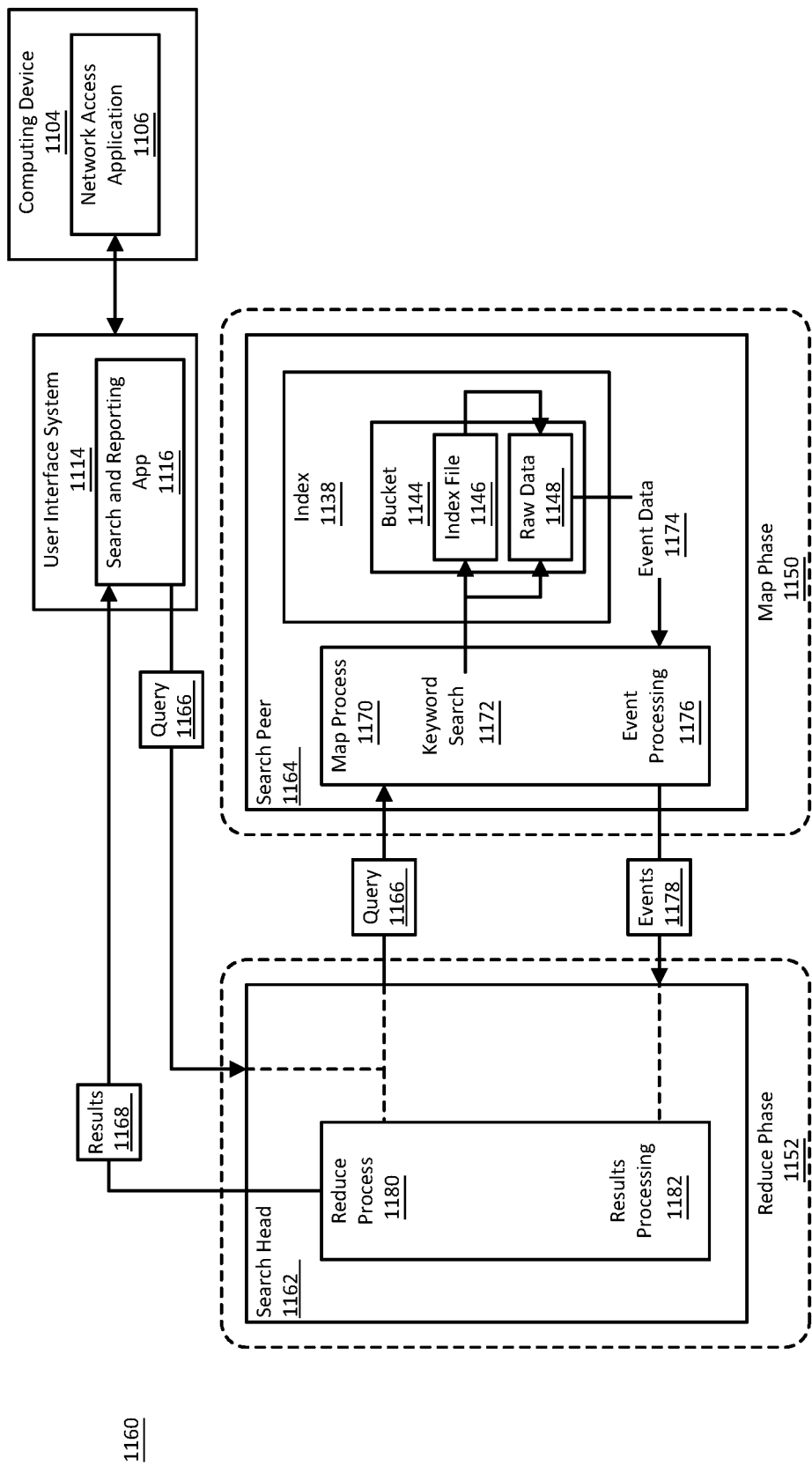
FIG. 11 is a block diagram illustrating in greater detail an example of the search system of a data intake and query system, such as the data intake and query system of FIG. 9.

FIG. 11 is a block diagram illustrating in greater detail an example of the search system 1160 of a data intake and query system, such as the data intake and query system 910 of FIG. 9. The search system 1160 of FIG. 11 issues a query 1166 to a search head 1162, which sends the query 1166 to a search peer 1164. Using a map process 1170, the search peer 1164 searches the appropriate index 1138 for events identified by the query 1166 and sends events 1178 so identified back to the search head 1162. Using a reduce process 1182, the search head 1162 processes the events 1178 and produces results 1168 to respond to the query 1166. The results 1168 can provide useful insights about the data stored in the index 1138. These insights can aid in the administration of information technology systems, in security analysis of information technology systems, and/or in analysis of the development environment provided by information technology systems.

The query 1166 that initiates a search is produced by a search and reporting app 1116 that is available through the user interface system 1114 of the data intake and query system. Using a network access application 1106 executing on a computing device 1104, a user can input the query 1166 into a search field provided by the search and reporting app 1116. Alternatively or additionally, the search and reporting app 1116 can include pre-configured queries or stored queries that can be activated by the user. In some cases, the search and reporting app 1116 initiates the query 1166 when the user enters the query 1166. In these cases, the query 1166 maybe referred to as an "ad-hoc" query. In some cases, the search and reporting app 1116 initiates the query 1166 based on a schedule. For example, the search and reporting app 1116 can be configured to execute the query 1166 once per hour, once per day, at a specific time, on a specific date, or at some other time that can be specified by a date, time, and/or frequency. These types of queries maybe referred to as scheduled queries.

The query 1166 is specified using a search processing language. The search processing language includes commands or search terms that the search peer 1164 will use to identify events to return in the search results 1168. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1166 to include sequential commands, where a subsequent command may operate on the results of a prior command. As an example, sequential commands may be separated in the query 1166 by a vertical line ("|" or "pipe") symbol.

In addition to one or more search commands, the query 1166 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1166 occurs in two broad phases: a map phase 1150 and a reduce phase 1152. The map phase 1150 takes place across one or more search peers. In the map phase 1150, the search peers locate event data that matches the search terms in the search query 1166 and sorts the event data into field-value pairs. When the map phase 1150 is complete, the search peers send events that they have found to one or more search heads for the reduce phase 1152. During the reduce phase 1152, the search heads process the events through commands in the search query 1166 and aggregate the events to produce the final search results 1168.

A search head, such as the search head 1162 illustrated in FIG. 11, is a component of the search system 1160 that manages searches. The search head 1162, which may also be referred to herein as a search management component, can be implemented using program code that can be executed on a computing device. The program code for the search head 1162 can be stored on a non-transitory computer-readable medium and from this medium can be loaded or copied to the memory of a computing device. One or more hardware processors of the computing device can read the program code from the memory and execute the program code in order to implement the operations of the search head 1162.

Upon receiving the search query 1166, the search head 1162 directs the query 1166 to one or more search peers, such as the search peer 1164 illustrated in FIG. 11. "Search peer" is an alternate name for "indexer" and a search peer may be largely similar to the indexer described previously. The search peer 1164 may be referred to as a "peer node" when the search peer 1164 is part of an indexer cluster. The search peer 1164, which may also be referred to as a search execution component, can be implemented using program code that can be executed on a computing device. In some implementations, one set of program code implements both the search head 1162 and the search peer 1164 such that the search head 1162 and the search peer 1164 form one component. In some implementations, the search head 1162 is an independent piece of code that performs searching and no indexing functionality. In these implementations, the search head 1162 may be referred to as a dedicated search head.

The search head 1162 may consider multiple criteria when determining whether to send the query 1166 to the particular search peer 1164. For example, the search system 1160 may be configured to include multiple search peers that each have duplicative copies of at least some of the event data and are implanted using different hardware resources q. In this example, the sending the search query 1166 to more than one search peer allows the search system 1160 to distribute the search workload across different hardware resources. As another example, search system 1160 may include different search peers for different purposes (e.g., one has an index storing a first type of data or from a first data source while a second has an index storing a second type of data or from a second data source). In this example, the search query 1166 may specify which indexes to search, and the search head 1162 will send the query 1166 to the search peers that have those indexes.

To identify events 1178 to send back to the search head 1162, the search peer 1164 performs a map process 1170 to obtain event data 1174 from the index 1138 that is maintained by the search peer 1164. During a first phase of the map process 1170, the search peer 1164 identifies buckets that have events that are described by the time indicator in the search query 1166. As noted above, a bucket contains events whose timestamps fall within a particular range of time. For each bucket 1144 whose events can be described by the time indicator, during a second phase of the map process 1170, the search peer 1164 performs a keyword search 1174 using search terms specified in the search query #A66. The search terms can be one or more of keywords, phrases, fields, Boolean expressions, and/or comparison expressions that in combination describe events being searched for. When segmentation is enabled at index time, the search peer 1164 performs the keyword search 1172 on the bucket's index file 1146. As noted previously, the index file 1146 includes a lexicon of the searchable terms in the events stored in the bucket's raw data 1148 file. The keyword search 1172 searches the lexicon for searchable terms that correspond to one or more of the search terms in the query 1166. As also noted above, the lexicon incudes, for each searchable term, a reference to each location in the raw data 1148 file where the searchable term can be found. Thus, when the keyword search identifies a searchable term in the index file 1146 that matches a search term in the query 1166, the search peer 1164 can use the location references to extract from the raw data 1148 file the event data 1174 for each event that include the searchable term.

In cases where segmentation was disabled at index time, the search peer 1164 performs the keyword search 1172 directly on the raw data 1148 file. To search the raw data 1148, the search peer 1164 may identify searchable segments in events in a similar manner as when the data was indexed. Thus, depending on how the search peer 1164 is configured, the search peer 1164 may look at event fields and/or parts of event fields to determine whether an event matches the query 1166. Any matching events can be added to the event data #A74 read from the raw data 1148 file. The search peer 1164 can further be configured to enable segmentation at search time, so that searching of the index 1138 causes the search peer 1164 to build a lexicon in the index file 1146.

The event data 1174 obtained from the raw data 1148 file includes the full text of each event found by the keyword search 1172. During a third phase of the map process 1170, the search peer 1164 performs event processing 1176 on the event data 1174, with the steps performed being determined by the configuration of the search peer 1164 and/or commands in the search query 1166. For example, the search peer 1164 can be configured to perform field discovery and field extraction. Field discovery is a process by which the search peer 1164 identifies and extracts key-value pairs from the events in the event data 1174. The search peer 1164 can, for example, be configured to automatically extract the first 100 fields (or another number of fields) in the event data 1174 that can be identified as key-value pairs. As another example, the search peer 1164 can extract any fields explicitly mentioned in the search query 1166. The search peer 1164 can, alternatively or additionally, be configured with particular field extractions to perform.

Other examples of steps that can be performed during event processing 1176 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1164 sends processed events 1178 to the search head 1162, which performs a reduce process 1180.

The reduce process 1180 potentially receives events from multiple search peers and performs various results processing 1182 steps on the received events. The results processing 1182 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1182 can further include applying commands from the search query 1166 to the events. The query 1166 can include, for example, commands for evaluating and/or manipulating fields (e.g., to generate new fields from existing fields or parse fields that have more than one value). As another example, the query 1166 can include commands for calculating statistics over the events, such as counts of the occurrences of fields, or sums, averages, ranges, and so on, of field values. As another example, the query 1166 can include commands for generating statistical values for purposes of generating charts of graphs of the events.

The reduce process 1180 outputs the events found by the search query 1166, as well as information about the events. The search head 1162 transmits the events and the information about the events as search results 1168, which are received by the search and reporting app 1116. The search and reporting app 1116 can generate visual interfaces for viewing the search results 1168. The search and reporting app 1116 can, for example, output visual interfaces for the network access application 1106 running on a computing device 1104 to generate.

The visual interfaces can include various visualizations of the search results 1168, such as tables, line or area charts, Chloropleth maps, or single values. The search and reporting app 1116 can organize the visualizations into a dashboard, where the dashboard includes a panel for each visualization. A dashboard can thus include, for example, a panel listing the raw event data for the events in the search results 1168, a panel listing fields extracted at index time and/or found through field discovery along with statistics for those fields, and/or a timeline chart indicating how many events occurred at specific points in time (as indicated by the timestamps associated with each event). In various implementations, the search and reporting app 1116 can provide one or more default dashboards. Alternatively or additionally, the search and reporting app 1116 can include functionality that enables a user to configure custom dashboards.

The search and reporting app 1116 can also enable further investigation into the events in the search results 1116. The process of further investigation may be referred to as drilldown. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1166. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 12:
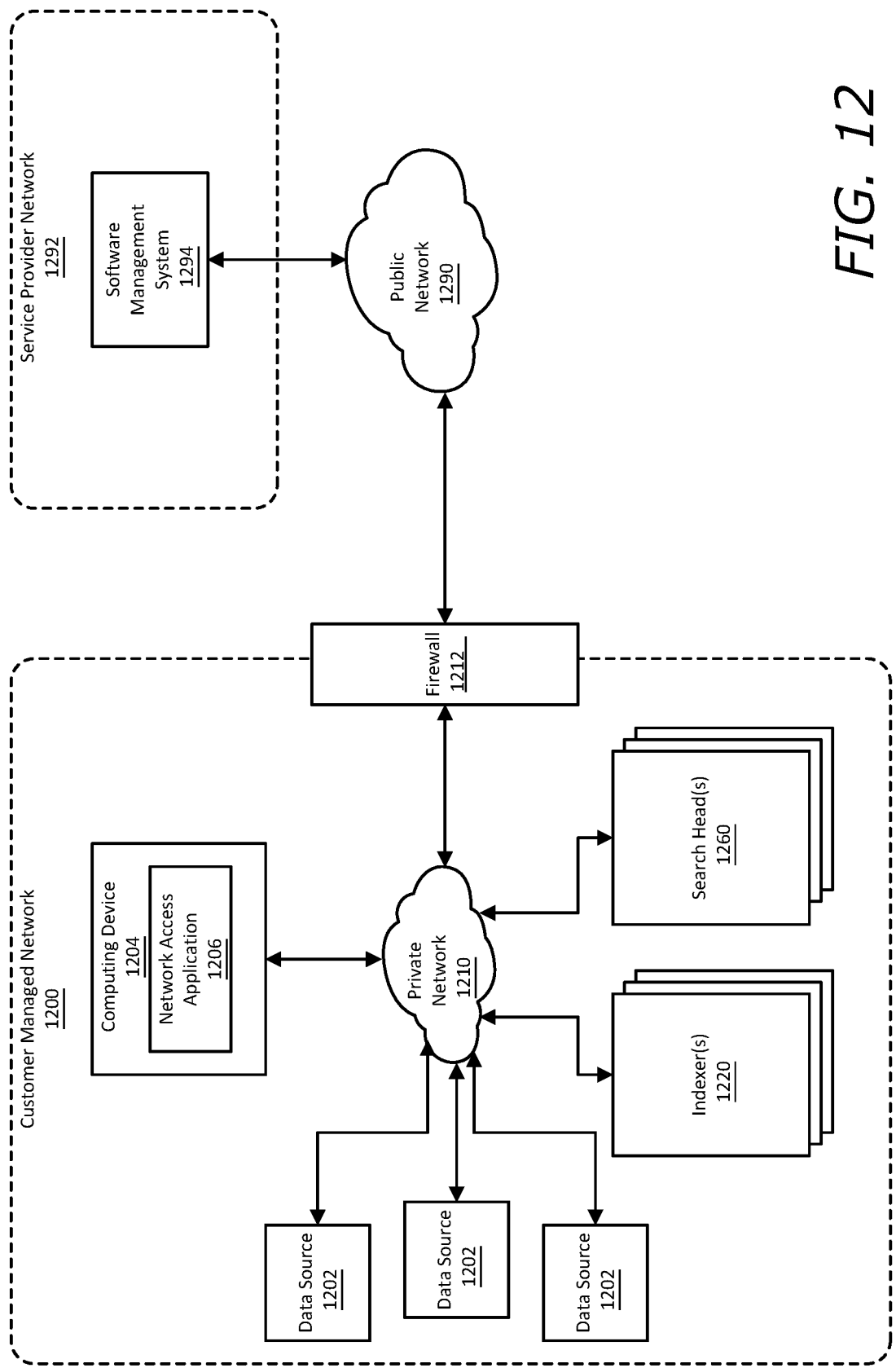
FIG. 12 illustrates an example of a self-managed network 1200 that includes a data intake and query system.

FIG. 12 illustrates an example of a self-managed network 1200 that includes a data intake and query system. "Self-managed" in this instance means that the entity that is operating the self-managed network 1200 configures, administers, maintains, and/or operates the data intake and query system using its own compute resources and people. Further, the self-managed network 1200 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1200 is located within the customer's on-prem environment, such as in the entity's data center, the operation and management of the self-managed network 1200, including of the resources in the self-managed network 1200, is under the control of the entity. For example, administrative personnel of the entity have complete access to and control over the configuration, management, and security of the self-managed network 1200 and its resources.

The self-managed network 1200 can execute one or more instances of the data intake and query system. An instance of the data intake and query system may be executed by one or more computing devices that are part of the self-managed network 1200. A data intake and query system instance can comprise an indexing system and a search system, where the indexing system includes one or more indexers 1220 and the search system includes one or more search heads 1260.

As depicted in FIG. 12, the self-managed network 1200 can include one or more data sources 1202. Data received from these data sources may be processed by an instance of the data intake and query system within self-managed network 1200. The data sources 1202 and the data intake and query system instance can be communicatively coupled to each other via a private network 1210.

Users associated with the entity can interact with and avail themselves of the functions performed by a data intake and query system instance using computing devices. As depicted in FIG. 12, a computing device 1204 can execute a network access application 1206 (e.g., a web browser), that can communicate with the data intake and query system instance and with data sources 1202 via the private network 1210. Using the computing device 1204, a user can perform various operations with respect to the data intake and query system, such as management and administration of the data intake and query system, generation of knowledge objects, and other functions. Results generated from processing performed by the data intake and query system instance may be communicated to the computing device 1204 and output to the user via an output system (e.g., a screen) of the computing device 1204.

The self-managed network 1200 can also be connected to other networks that are outside the entity's on-premise environment/network, such as networks outside the entity's data center. Connectivity to these other external networks is controlled and regulated through one or more layers of security provided by the self-managed network 1200. One or more of these security layers can be implemented using firewalls 1212. The firewalls 1212 form a layer of security around the self-managed network 1200 and regulate the transmission of traffic from the self-managed network 1200 to the other networks and from these other networks to the self-managed network 1200.

Networks external to the self-managed network can include various types of networks including public networks 1290, other private networks, and/or cloud networks provided by one or more cloud service providers. An example of a public network 1290 is the Internet. In the example depicted in FIG. 12, the self-managed network 1200 is connected to a service provider network 1292 provided by a cloud service provider via the public network 1290.

In some implementations, resources provided by a cloud service provider may be used to facilitate the configuration and management of resources within the self-managed network 1200. For example, configuration and management of a data intake and query system instance in the self-managed network 1200 may be facilitated by a software management system 1294 operating in the service provider network 1292. There are various ways in which the software management system 1294 can facilitate the configuration and management of a data intake and query system instance within the self-managed network 1200. As one example, the software management system 1294 may facilitate the download of software including software updates for the data intake and query system. In this example, the software management system 1294 may store information indicative of the versions of the various data intake and query system instances present in the self-managed network 1200. When a software patch or upgrade is available for an instance, the software management system 1294 may inform the self-managed network 1200 of the patch or upgrade. This can be done via messages communicated from the software management system 1294 to the self-managed network 1200.

The software management system 1294 may also provide simplified ways for the patches and/or upgrades to be downloaded and applied to the self-managed network 1200. For example, a message communicated from the software management system 1294 to the self-managed network 1200 regarding a software upgrade may include a Uniform Resource Identifier (URI) that can be used by a system administrator of the self-managed network 1200 to download the upgrade to the self-managed network 1200. In this manner, management resources provided by a cloud service provider using the service provider network 1292 and which are located outside the self-managed network 1200 can be used to facilitate the configuration and management of one or more resources within the entity's on-prem environment. In some implementations, the download of the upgrades and patches may be automated, whereby the software management system 1294 is authorized to, upon determining that a patch is applicable to a data intake and query system instance inside the self-managed network 1200, automatically communicate the upgrade or patch to self-managed network 1200 and cause it to be installed within self-managed network 1200.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computerized method for an anomaly detection process, the computerized method comprising:
    obtaining a time-series dataset;
    determining a prediction of points in the time-series dataset through execution of a forecasting machine learning algorithm based on previous points in the time-series dataset;

determining a set of error values, wherein the set of error values includes an error value between each predicted point and a corresponding point in the time-series dataset;

detecting one or more anomalous points within the time-series dataset through a heuristic analysis of the set of error values, wherein the heuristic analysis results in determination of a sensitivity threshold separating the one or more anomalous points from a remaining set of points in the time-series dataset;

generating an auto-tuned search query by incorporating the sensitivity threshold into a predetermined search query that implements the anomaly detection process; and generating a visual representation of results produced from processing of the auto-tuned search query, wherein the results are to be displayed on a graphical user interface rendered on a display screen of a network device.

2. The computerized method of claim 1, further comprising:

determining a seasonality component identifying recurring variations in the time-series dataset to enhance detection of anomalies.

3. The computerized method of claim 1, wherein the forecasting machine learning algorithm includes a seasonality component determined through operations including:

identifying a set of candidate seasonal frequencies associated with the time-series dataset based on a set of auto-correlation function (ACF) peaks;

applying a set of filters causing analysis the set of candidate seasonal frequencies and updating of the set of candidate seasonal frequencies by removing any candidate seasonal frequencies that fail a filter from the set of candidate seasonal frequencies; and identifying a candidate seasonal frequency of the updated set of candidate seasonal frequencies as the seasonality component for the time-series dataset.

4. The computerized method of claim 1, wherein execution of the forecasting machine learning algorithm generates a trained machine learning model configured to predict each point in the time-series dataset based on the previous points in in the time-series dataset through performance of a training procedure by providing the forecasting machine learning algorithm with the time-series dataset as input, and wherein the trained machine learning model is stored in a non-transitory, computer-readable medium.

5. The computerized method of claim 1, further comprising:

receiving user input indicating an adjustment to a sensitivity level in detecting the one or more anomalous points;

performing a second heuristic analysis that results in determination of a second sensitivity threshold, wherein the second sensitivity threshold causes detection of either a greater or lesser number of the detected anomalies than were detected previously; and generating a revised auto-tuned search query by incorporating the second sensitivity threshold into the predetermined search query that implements the anomaly detection process.

6. The computerized method of claim 1, wherein the heuristic analysis includes a mathematical optimization procedure resulting in selection of the one or more anomalies that represent a subset of predicted points being most anomalous.

7. The computerized method of claim 1, wherein the time-series dataset is a set of values of variable that are ordered by a timestamp associated with each value of the set of values.

8. A computing device, comprising:

a processor; and a non-transitory computer-readable medium having stored thereon instructions that, when executed by the processor, cause the processor to perform an anomaly detection process comprising operations including:

obtaining a time-series dataset;

determining a prediction of points in the time-series dataset through execution of a forecasting machine learning algorithm based on previous points in the time-series dataset;

determining a set of error values, wherein the set of error values includes an error value between each predicted point and a corresponding point in the time-series dataset;

detecting one or more anomalous points within the time-series dataset through a heuristic analysis of the set of error values, wherein the heuristic analysis results in determination of a sensitivity threshold separating the one or more anomalous points from a remaining set of points in the time-series dataset;

generating an auto-tuned search query by incorporating the sensitivity threshold into a predetermined search query that implements the anomaly detection process; and generating a visual representation of results produced from processing of the auto-tuned search query, wherein the results are to be displayed on a graphical user interface rendered on a display screen of a network device.

9. The computing device of claim 8, wherein the operations of the anomaly detection process further comprise:

determining a seasonality component identifying recurring variations in the time-series dataset to enhance detection of anomalies.

10. The computing device of claim 8, wherein the forecasting machine learning algorithm includes a seasonality component determined through operations including:

identifying a set of candidate seasonal frequencies associated with the time-series dataset based on a set of auto-correlation function (ACF) peaks;

applying a set of filters causing analysis the set of candidate seasonal frequencies and updating of the set of candidate seasonal frequencies by removing any candidate seasonal frequencies that fail a filter from the set of candidate seasonal frequencies; and identifying a candidate seasonal frequency of the updated set of candidate seasonal frequencies as the seasonality component for the time-series dataset.

11. The computing device of claim 8, wherein execution of the forecasting machine learning algorithm generates a trained machine learning model configured to predict each point in the time-series dataset based on the previous points in in the time-series dataset through performance of a training procedure by providing the forecasting machine learning algorithm with the time-series dataset as input, and wherein the trained machine learning model is stored in the non-transitory computer-readable medium.

12. The computing device of claim 8, wherein the operations the operations of the anomaly detection process further comprise including:

receiving user input indicating an adjustment to a sensitivity level in detecting the one or more anomalous points;

performing a second heuristic analysis that results in determination of a second sensitivity threshold, wherein the second sensitivity threshold causes detection of either a greater or lesser number of detected anomalies than were detected previously; and generating a revised auto-tuned search query by incorporating the second sensitivity threshold into the predetermined search query that implements the anomaly detection process.

13. The computing device of claim 8, wherein the heuristic analysis includes a mathematical optimization procedure resulting in selection of the one or more anomalies that represent a subset of predicted points being most anomalous.

14. The computing device of claim 8, wherein the time-series dataset is a set of values of variable that are ordered by a timestamp associated with each value of the set of values.

15. A non-transitory computer-readable medium having stored thereon instructions that, when executed by one or more processors, cause the one or more processor to perform an anomaly detection process comprising operations including:

obtaining a time-series dataset;

determining a prediction of points in the time-series dataset through execution of a forecasting machine learning algorithm based on previous points in the time-series dataset;

determining a set of error values, wherein the set of error values includes an error value between each predicted point and a corresponding point in the time-series dataset;

detecting one or more anomalous points within the time-series dataset through a heuristic analysis of the set of error values, wherein the heuristic analysis results in determination of a sensitivity threshold separating the one or more anomalous points from a remaining set of points in the time-series dataset;

generating an auto-tuned search query by incorporating the sensitivity threshold into a predetermined search query that implements that implements the anomaly detection process; and generating a visual representation of results produced from processing of the auto-tuned search query, wherein the results are to be displayed on a graphical user interface rendered on a display screen of a network device.

16. The non-transitory computer-readable medium of claim 15, wherein the operations of the anomaly detection process further comprise:

determining a seasonality component identifying recurring variations in the time-series dataset to enhance detection of anomalies.

17. The non-transitory computer-readable medium of claim 15, wherein the forecasting machine learning algorithm includes a seasonality component determined through operations including:

identifying a set of candidate seasonal frequencies associated with the time-series dataset based on a set of auto-correlation function (ACF) peaks;

applying a set of filters causing analysis the set of candidate seasonal frequencies and updating of the set of candidate seasonal frequencies by removing any candidate seasonal frequencies that fail a filter from the set of candidate seasonal frequencies; and identifying a candidate seasonal frequency of the updated set of candidate seasonal frequencies as the seasonality component for the time-series dataset.

18. The non-transitory computer-readable medium of claim 15, wherein execution of the forecasting machine learning algorithm generates a trained machine learning model configured to predict each point in the time-series dataset based on the previous points in in the time-series dataset through performance of a training procedure by providing the forecasting machine learning algorithm with the time-series dataset as input, and wherein the trained machine learning model is stored in the non-transitory computer-readable medium.

19. The non-transitory computer-readable medium of claim 15, wherein the operations further including:

receiving user input indicating an adjustment to a sensitivity level in detecting the one or more anomalous points;

performing a second heuristic analysis that results in determination of a second sensitivity threshold, wherein the second sensitivity threshold causes detection of either a greater or lesser number of detected anomalies than were detected previously; and generating a revised auto-tuned search query by incorporating the second sensitivity threshold into the predetermined search query that implements the anomaly detection process.

20. The non-transitory computer-readable medium of claim 15, wherein the heuristic analysis includes a mathematical optimization procedure resulting in selection of the one or more anomalies that represent a subset of predicted points being most anomalous.

* * * * *